(12) United States Patent
Ujibashi et al.

(10) Patent No.: US 11,176,177 B2
(45) Date of Patent: Nov. 16, 2021

(54) COMPUTER-READABLE RECORDING MEDIUM STORING SEARCH PROGRAM AND SEARCH METHOD

(71) Applicant: FUJITSU LIMITED, Kawasaki (JP)

(72) Inventors: Yoshifumi Ujibashi, Kawasaki (JP); Yui Noma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 225 days.

(21) Appl. No.: 16/268,839

(22) Filed: Feb. 6, 2019

(65) Prior Publication Data

US 2019/0278785 A1 Sep. 12, 2019

(30) Foreign Application Priority Data

Mar. 7, 2018 (JP) .............................. JP2018-040514

(51) Int. Cl.
| | |
|---|---|
| G06F 16/30 | (2019.01) |
| G06F 16/28 | (2019.01) |
| G06F 16/245 | (2019.01) |
| G06F 16/25 | (2019.01) |

(52) U.S. Cl.
CPC .......... *G06F 16/285* (2019.01); *G06F 16/245* (2019.01); *G06F 16/258* (2019.01)

(58) Field of Classification Search
CPC ...... G06F 16/30; G06F 16/285; G06F 16/245; G06F 16/258
USPC ........ 707/609, 687, 705, 769, 790, 813, 821
See application file for complete search history.

(56) References Cited

U.S. PATENT DOCUMENTS

| | | | | |
|---|---|---|---|---|
| 6,542,896 | B1* | 4/2003 | Gruenwald | ............. G06F 16/30 |
| 9,442,980 | B1* | 9/2016 | Trepetin | .............. G06F 21/6254 |
| 9,946,810 | B1* | 4/2018 | Trepetin | .................. H04L 9/008 |
| 10,936,744 | B1* | 3/2021 | Trepetin | .................. H04L 9/002 |
| 2013/0262842 | A1 | 10/2013 | Chiba et al. | |

FOREIGN PATENT DOCUMENTS

| | | |
|---|---|---|
| JP | H10-171643 | 6/1998 |
| JP | 2013-206290 | 10/2013 |

OTHER PUBLICATIONS

Sumit Gulwani, "Automating String Processing in Spreadsheets Using Input-Output Examples", Proceedings of the 38th annual ACM SIGPLAN-SIGACT symposium on Principles of programming languages (POPL '11), Jan. 26-28, 2011 (13 pages).

(Continued)

*Primary Examiner* — Sana A Al-Hashemi
(74) *Attorney, Agent, or Firm* — Fujitsu Patent Center

(57) ABSTRACT

In a search apparatus, a processing unit obtains input data and output data and stores these data in a storage unit. The processing unit classifies a plurality of data conversion methods into a plurality of groups. With respect to each group, the processing unit produces intermediate data from the input data using the data conversion methods belonging to the group, and evaluates the intermediate data using an evaluation function corresponding to the group, in order to thereby search for a combination of data conversion methods within the group. The processing unit determines a combination of data conversion methods that is able to convert the input data into the output data on the basis of the search results obtained for the plurality of groups.

8 Claims, 24 Drawing Sheets

(56) References Cited

OTHER PUBLICATIONS

Rishabh Singh et al., "Learning Semantic String Transformations from Examples", Proceedings of the VLDB Endowment, Aug. 27-31, 2012 (12 pages).
Zhongjun Jin et al., "Foofah: Transforming Data By Example", Proceedings of the 2017 ACM International Conference on Management of Data (SIGMOD'17), May 14-19, 2017 (16 pages).

* cited by examiner

EXAMPLE OF GENERATING PROGRAM

INPUT OF PROCESSING EXAMPLE

| SOURCE DATA 31 | | | | TARGET DATA 32 | | | |
|---|---|---|---|---|---|---|---|
| ID | DATE AND TIME | ENTRAINING STATION | | DATE | STATION NAME | GENDER | AGE |
| 0123 | 8/1 16:00 | Shinjuku | | 8/1 | Shinjuku | Female | 23 |
| 2342 | 8/1 17:55 | 0000 | | 8/1 | null | Male | 45 |

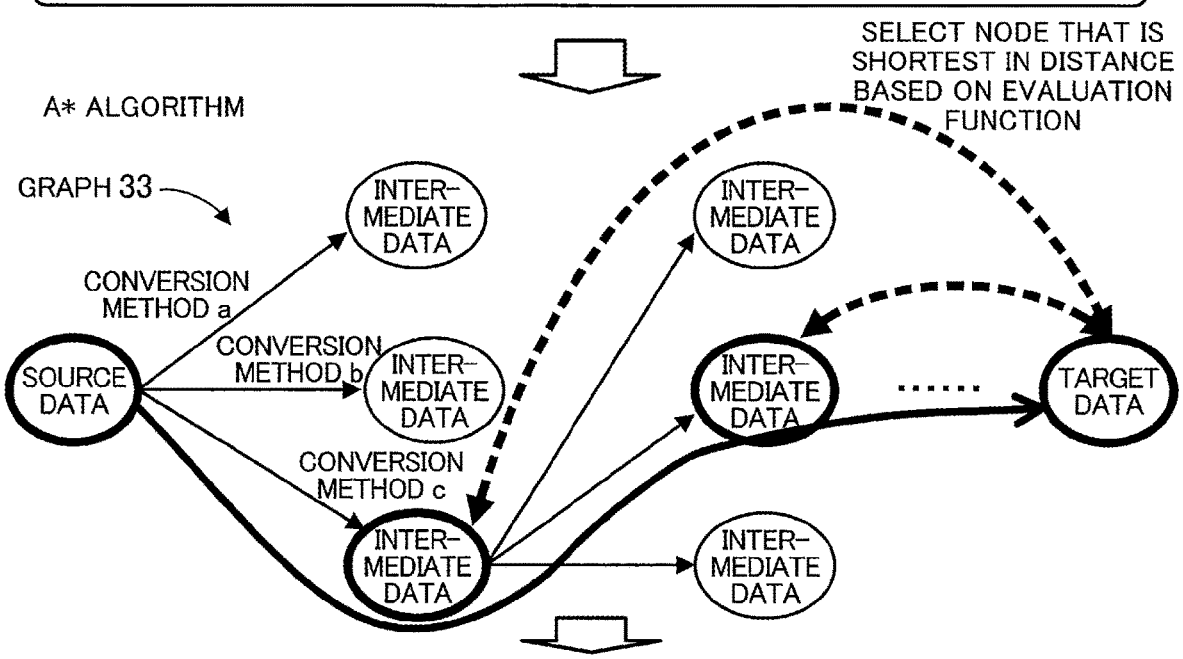

A* ALGORITHM

SELECT NODE THAT IS SHORTEST IN DISTANCE BASED ON EVALUATION FUNCTION

PROGRAM 34

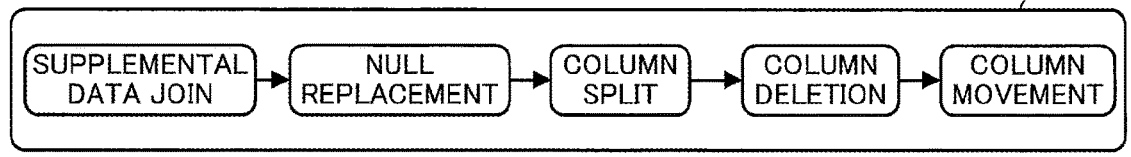

SUPPLEMENTAL DATA JOIN → NULL REPLACEMENT → COLUMN SPLIT → COLUMN DELETION → COLUMN MOVEMENT

EXECUTION OF CONVERSION

| SOURCE DATA 35 | | | | TARGET DATA 36 | | | |
|---|---|---|---|---|---|---|---|
| ID | DATE AND TIME | ENTRAINING STATION | AUTO-MATIC | DATE | STATION NAME | GENDER | AGE |
| 6734 | 8/3 13:15 | Yokohama | | 8/3 | Yokohama | Male | 51 |
| 3852 | 8/4 20:18 | Shinjuku | | 8/4 | Shinjuku | Female | 48 |

FIG. 3

EXAMPLE OF DISTANCE

GROUPING DEFINITION STORAGE UNIT — 130

GROUPING PATTERN TABLE — 131

| CONVERSION METHOD | $g_{opt}=1$ | $g_{opt}=2$ | $g_{opt}=3$ | $g_{opt}=4$ | ... |
|---|---|---|---|---|---|
| STRING CONVERSION | 1 | 1 | 1 | 1 | ... |
| STRING EXTRACTION | 1 | 1 | 1 | 1 | ... |
| VALUE CONVERSION | 1 | 1 | 2 | 2 | ... |
| UNIT CONVERSION | 1 | 1 | 2 | 2 | ... |
| TIME CONVERSION | 1 | 1 | 2 | 3 | ... |
| SCHEMA CONVERION | 1 | 2 | 3 | 4 | ... |
| TABLE JOIN | 1 | 2 | 3 | 4 | ... |
| ... | ... | ... | ... | ... | ... |

FIG. 10

GROUPING DEFINITION STORAGE UNIT

DISSIMILARITY TABLE

| METHOD NAME / METHOD NAME | STRING CONVERSION | STRING EXTRACTION | VALUE CONVERSION | UNIT CONVERSION | TIME CONVERSION | SCHEMA CONVERSION | TABLE JOIN | ... |
|---|---|---|---|---|---|---|---|---|
| STRING CONVERSION |  | 10 | 40 | 30 | 20 | 100 | 150 | ... |
| STRING EXTRACTION | — |  | 35 | 35 | 30 | 100 | 150 | ... |
| VALUE CONVERSION | — | — |  | 20 | 40 | 100 | 150 | ... |
| UNIT CONVERSION | — | — | — |  | 25 | 100 | 150 | ... |
| TIME CONVERSION | — | — | — | — |  | — | — | ... |
| SCHEMA CONVERSION | — | — | — | — | — |  | 30 | ... |
| TABLE JOIN | — | — | — | — | — | — |  | ... |
| ... | ... | ... | ... | ... | ... | ... | ... | ... |

FIG. 14

| SOURCE DATA | | |
|---|---|---|
| Item | Price | Quantity |
| apple(China) | 100 | 50 |
| orange Brazil | 200 | 100 |

FIG. 16A

| TARGET DATA | | |
|---|---|---|
| Item | Region | Sale(incl. tax) |
| apple | China | 5400 |
| orange | Brazil | 21600 |

FIG. 16B

EXTRACT TERM FOLLOWING FIRST DELIMITER FROM FIRST COLUMN

| apple(China) |  | 100 | 50 |
|---|---|---|---|
| orange Brazil | Brazil | 200 | 100 |

INTERMEDIATE DATA — A1

FIG. 17A

EXTRACT FIRST TERM THAT STARTS WITH NON-ALPHABETIC CHARACTER FROM FIRST COLUMN

| apple(China) | (China) | 100 | 50 |
|---|---|---|---|
| orange Brazil | Brazil | 200 | 100 |

INTERMEDIATE DATA — A2

FIG. 17B

SECOND EXAMPLE OF CALCULATING LOCAL EVALUATION VALUE

CALCULATE PRODUCT OF SECOND AND THIRD COLUMNS

CALCULATE SUM OF SECOND AND THIRD COLUMNS

THIRD EXAMPLE OF CALCULATING LOCAL EVALUATION VALUE

COMPUTER-READABLE RECORDING MEDIUM STORING SEARCH PROGRAM AND SEARCH METHOD

CROSS-REFERENCE TO RELATED APPLICATION

This application is based upon and claims the benefit of priority of the prior Japanese Patent Application No. 2018-040514, filed on Mar. 7, 2018, the entire contents of which are incorporated herein by reference.

FIELD

The embodiments discussed herein relate to a computer-readable recording medium storing a search program and a search method.

BACKGROUND

At present, programming by example (PBE) techniques have been considered for automatically generating programs with information processing apparatuses. In a PBE system, an information processing apparatus automatically generates a program when receiving input and output examples.

For example, there has been proposed a program synthesizer that synthesizes programs using an execution locus as an input. This proposed program synthesizer creates a generalized term rewriting system list on the basis of term rewriting examples that are an execution locus representing term rewriting based on term rewriting systems, and generates a term rewriting system program that simulates the execution locus based on various term rewriting systems, on the basis of the term rewriting system list.

There has also been proposed an information processing apparatus that converts a combination of two or more instructions included in first code into single instruction multiple data (SIMD) instructions to thereby generate second code.

Please see, for example, Japanese Laid-open Patent Publication No. 10-171643.

Also, please see, for example, Japanese Laid-open Patent Publication No. 2013-206290.

In order to automatically generate a program on the basis of input and output examples with an information processing apparatus, the following method is considered: a plurality of data conversion methods are prepared, a search is carried out to find a combination of data conversion methods that is able to produce the output data from the input data, and then a program corresponding to the combination is generated.

To make the search efficient, intermediate data may be produced by sequentially applying the data conversion methods to the input data and be evaluated using a prescribed evaluation function, and then search paths may be narrowed down. More specifically, the search is carried out in such a way that, with all the data conversion methods as next selection candidates, intermediate data is produced by applying each data conversion method to the input data or current intermediate data and is evaluated using an evaluation function, and then conversion methods corresponding to highly evaluated intermediate data are selected.

However, the above method has the following problems: the more the number of data conversion methods, the more the number of combinations of data conversion methods and the higher the search cost. The use of the evaluation function only may fail to achieve sufficiently efficient search, depending on the number of data conversion methods, and may make the search time even longer.

SUMMARY

According to one aspect, there is provided a non-transitory computer-readable recording medium storing a computer program that causes a computer to perform a process including: obtaining input data and output data; classifying a plurality of data conversion methods into a plurality of groups; producing, with respect to each of the plurality of groups, intermediate data from the input data using data conversion methods belonging to the group and evaluating the intermediate data using an evaluation function corresponding to the group, in order to carry out a search for a combination of data conversion methods within the group; and determining a combination of data conversion methods that is able to convert the input data into the output data, based on results of the search carried out for the plurality of groups.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of generating a program;

FIG. 10 illustrates an example of a grouping pattern table;

FIG. 14 illustrates an example of a dissimilarity table;

FIGS. 16A and 16B illustrate examples of source data and target data;

FIGS. 17A and 17B illustrate first examples of intermediate data;

DESCRIPTION OF EMBODIMENTS

Hereinafter, preferred embodiments will now be described with reference to the accompanying drawings.

First Embodiment

A first embodiment will be described.

Figure 1:
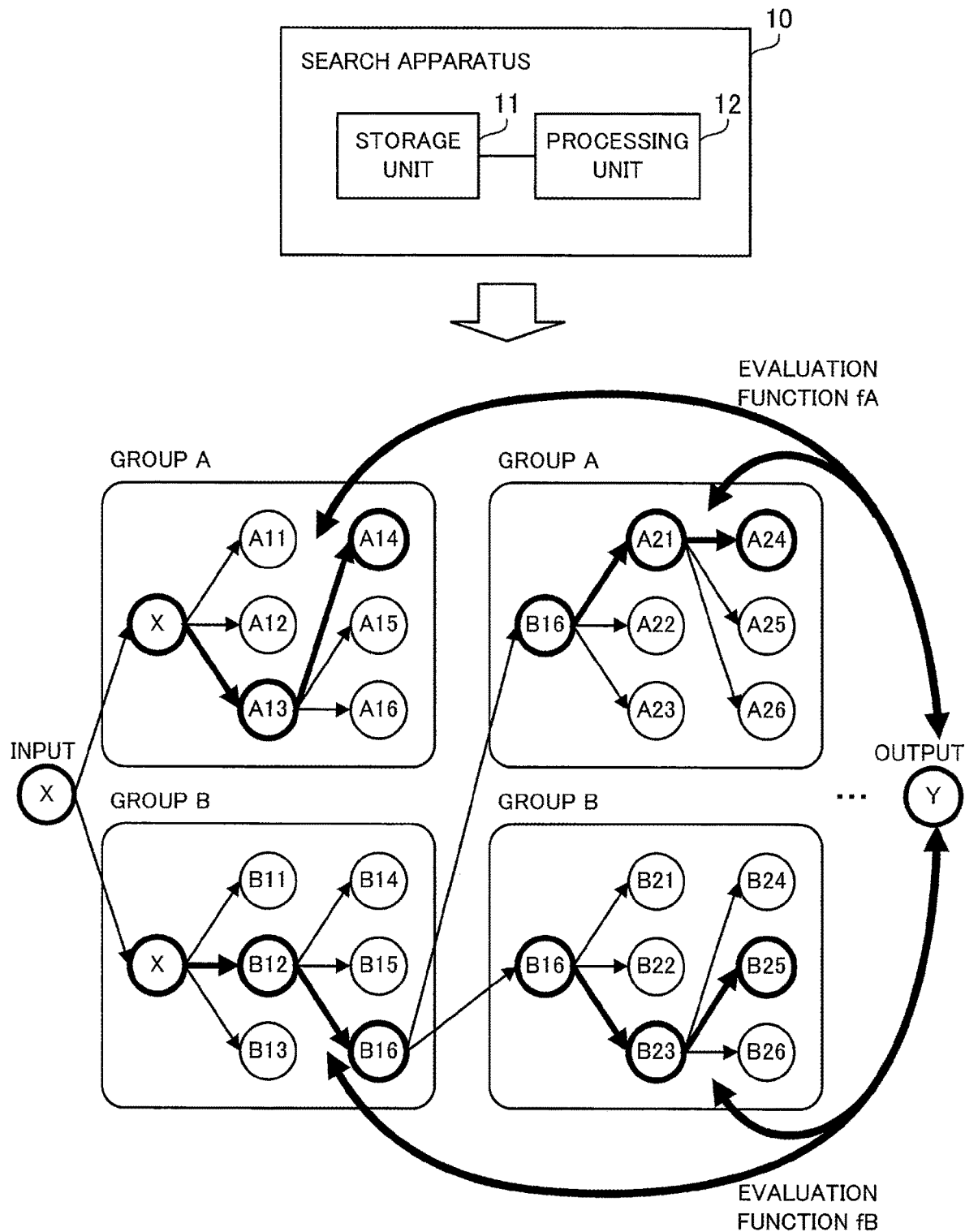
FIG. 1 illustrates an example of a search apparatus according to a first embodiment.

FIG. 1 illustrates an example of a search apparatus according to the first embodiment. The search apparatus 10 obtains an example of input and output data and generates a program that converts the input data into the output data. The search apparatus 10 includes a storage unit 11 and a processing unit 12.

The storage unit 11 may be a volatile storage device, such as a random access memory (RAM), or a non-volatile storage device, such as a hard disk drive (HDD) or a flash memory. The processing unit 12 may include a central processing unit (CPU), a digital signal processor (DSP), an application-specific integrated circuit (ASIC), field-programmable gate array (FPGA), or others. The processing unit 12 may be a processor that executes a program. The "processor" here may include a set of multiple processors (multiprocessor).

The storage unit 11 stores therein data to be used in operations by the processing unit 12. For example, the storage unit 11 stores therein criteria data for use in classifying a plurality of data conversion methods into groups. The storage unit 11 also stores therein input data and output data received from the processing unit 12. In addition, the storage unit 11 stores therein intermediate data produced from the input data with data conversion methods by the processing unit 12.

The processing unit 12 obtains an example of input data X and output data Y. For example, the input data X and output data Y include information, such as a string, a value, a unit, or a time. The input data X may be an example of a relational database (RDB) table, and the output data Y may be an example of a converted table.

The processing unit 12 classifies a plurality of data conversion methods into a plurality of groups. Examples of the data conversion methods include string conversion, string extraction, value conversion, unit conversion, time conversion, and others. Examples of the string conversion include null replacement, terminology standardization, and others. Examples of the string extraction include a process of extracting terms separated by delimiters such as commas, and others. Examples of the value conversion include a process of converting a value with four arithmetic operations, and others. Examples of the time conversion include a process of converting an absolute time into a relative time with respect to a reference time, and others. Note that the data conversion methods are not limited to these, and other examples of the data conversion methods are considered, including schema conversion (movement, deletion, or copy of a column) and table join (joining of a supplemental table) in an RDB table.

For example, the processing unit 12 is able to classify the aforementioned examples of data conversion methods into a plurality of groups on the basis of the criteria data stored in the storage unit 11. For example, the number of groups may be registered in the storage unit in advance or may be determined with prescribed operations by the processing unit 12. In this connection, for example, a rate of reduction in a search space is expressed as a function of a distance (the number of hops) from input data to output data, the number of data conversion methods (known value), and the number of groups. Therefore, the processing unit 12 may be configured to estimate an index value indicating the distance between the input data X and the output data Y and then to determine the number of groups using the index value. For example, the processing unit 12 substitutes the index value into the function that indicates the rate of reduction in the search space, and selects the number of groups such as to obtain a relatively small rate of reduction in the search space.

In addition, the criteria data may be information indicating into which group a combination of data conversion methods is classified, among the selected number of groups. In this case, a group to which each type of data conversion methods belongs is determined in advance. For example, each of the plurality of data conversion methods is associated with an evaluation function for intermediate data, to be described later. The criteria data may be created such as to preferentially group data conversion methods that have commonality in their evaluation functions. In this case, it is said that the processing unit 12 classifies the plurality of data conversion methods on the basis of the commonality of the evaluation functions.

Alternatively, the criteria data may be similarity information indicating the degree of similarity (or degree of dissimilarity) between the plurality of data conversion methods. In this case, the processing unit 12 determines the number of groups on the basis of the number of data conversion methods to be used. Then, the processing unit 12 generates the determined number of groups with reference to the similarity information. More specifically, the processing unit 12 may classify the data conversion methods into the groups such that data conversion methods having a high degree of similarity (a low degree of dissimilarity) preferentially belong to the same group.

With respect to each group, the processing unit 12 produces intermediate data from the input data using the data conversion methods belonging to the group. For example, assume that the processing unit 12 has classified the plurality of data conversion methods into two groups: group A and group B. As an example, the group A includes three data conversion methods (first, second, and third data conversion methods), whereas the group B includes three data conversion methods (fourth, fifth, and sixth data conversion methods).

The processing unit 12 produces intermediate data A11, A12, and A13 from the input data X using the data conversion methods belonging to the group A. That is, the processing unit 12 produces intermediate data A11 from the input data X using the first data conversion method, produces intermediate data A12 from the input data X using the second data conversion method, and produces intermediate data A13 from the input data X using the third data conversion method.

The processing unit 12 evaluates the intermediate data using an evaluation function corresponding to the group A to search for a combination of data conversion methods within the group A. The evaluation function provides an evaluation value for a path from the input data via the intermediate data to the output data. For example, the evaluation value is an index indicating a cost, such as a distance, a value difference, a time difference, or the number of steps. A smaller evaluation value is considered to indicate a lower processing cost to obtain the output data (that is, highly evaluated).

For example, an edit distance (Levenshtein distance) is considered as an evaluation value of an evaluation function for the string conversion and the string extraction. A value difference is considered as an evaluation value of an evaluation function for the value conversion. A quotient of values before and after conversion (for example, post-conversion value pre-conversion value) is considered as an evaluation value of an evaluation function for the unit conversion. A time difference (a difference from a reference time, or another) is considered as an evaluation value of an evaluation function for the time conversion. A table edit distance (the number of steps needed for a column operation, or another) is considered as an evaluation value of an evaluation function for the schema conversion and the table conversion.

Here, the processing unit 12 previously determines an evaluation function for each group on the basis of the data conversion methods belonging to the group. Each data conversion method is associated with an evaluation function. The storage unit 11 may store therein information associating each data conversion method with an evaluation function. In the case where only data conversion methods associated with the same evaluation function belong to a certain group, the processing unit 12 determines the same evaluation function as an evaluation function corresponding to the group. In the case where a first data conversion method associated with a first evaluation function and a second data conversion method associated with a second evaluation function belong to the same group, the processing unit 12 calculates an evaluation function corresponding to this group on the basis of the first and second evaluation functions. For example, the processing unit 12 may take a linear combination (weighted sum) of the first and second evaluation functions (or three or more different evaluation functions) as an evaluation function corresponding to the group. In this way, the processing unit 12 determines an evaluation function fA corresponding to the group A and an evaluation function fB corresponding to the group B.

The processing unit 12 evaluates the intermediate data using the evaluation function fA corresponding to the group A. For example, assume that the data conversion methods belonging to the group A are the string conversion and the string extraction. In this case, the evaluation function fA is a function of calculating an edit distance as an evaluation value of the intermediate data. The edit distance is the sum of a first edit distance between the input data X and the intermediate data and a second edit distance between the intermediate data and the output data Y.

The processing unit 12 calculates the sum of the edit distance between the input data X and the intermediate data A11 and the edit distance between the intermediate data A11 and the output data Y as an evaluation value of the intermediate data A11. In addition, the processing unit 12 calculates an evaluation value of the intermediate data A12 and an evaluation value of the intermediate data A13 in the same manner. For example, assuming that the evaluation value of the intermediate data A13 is the minimum among these evaluation values, the processing unit 12 selects the third data conversion method, which produces the intermediate data A13 from the input data X.

Then, the processing unit 12 applies the first, second, and third data conversion methods to the intermediate data A13 to produce intermediate data A14, A15, and A16, respectively. The processing unit 12 calculates the sum of the edit distance between the input data X and the intermediate data A14 and the edit distance between the intermediate data A14 and the output data Y as the evaluation value of the intermediate data A14. In addition, the processing unit 12 calculates the evaluation value of the intermediate data A15 and the evaluation value of the intermediate data A16 in the same manner. For example, assuming that the evaluation value of the intermediate data A14 is the minimum among these evaluation values, the processing unit 12 selects the first data conversion method, which produces the intermediate data A14 from the intermediate data A13.

By repeatedly selecting a data conversion method with respect to the group A in this way, the processing unit 12 searches for a combination of data conversion methods within the group A. The upper limit for the number of iterations for the selection is registered in the storage unit 11 in advance. If the output data Y is not obtained by repeating the search the upper limit number of times, the processing unit 12 terminates the search for a combination of data conversion methods in the group A. In the example of FIG. 1, the upper limit for the number of iterations is "two", and the processing unit 12 fails to obtain the output data Y as a result of carrying out the search with the input data X as a start point twice. That is, after the processing unit 12 selects the intermediate data A14, the processing unit 12 terminates the search for a combination of data conversion methods with respect to the group A.

In addition, the processing unit 12 carries out a search for a combination of data conversion methods with the input data X as a start point in the group B. First, with respect to the group B, the processing unit 12 generates intermediate data B11, B12, and B13 from the input data X using the data conversion methods belonging to the group B.

The processing unit 12 evaluates the intermediate data using the evaluation function fB corresponding to the group B. For example, assume that the data conversion methods belonging to the group B are value conversions. In this case, the evaluation function fB is a function of calculating a value difference as an evaluation value of the intermediate data. The value difference is calculated as the sum (first difference plus second difference) of the first difference between the value included in the input data X and the value included in the intermediate data and the second difference between the value included in the intermediate data and the value included in the output data Y.

The processing unit 12 calculates the evaluation values of the intermediate data B11, B12, and B13 using the evaluation function fB. For example, assuming that the evaluation value of the intermediate data B12 is the minimum among these evaluation values, the processing unit 12 selects the fifth data conversion method, which produces the intermediate data B12 from the input data X.

After that, the processing unit 12 applies the fourth, fifth, and sixth data conversion methods to the intermediate data B12 to produce intermediate data B14, B15, and B16, respectively. On the basis of the evaluation values of the intermediate data B14, B15, and B16 calculated using the evaluation function fB, the processing unit 12 selects the sixth data conversion method, which produces the intermediate data B16 from the intermediate data B12.

Then, the processing unit 12 fails to obtain the output data Y as a result of carrying out the above search with the input data as the start point twice. Therefore, after the processing unit 12 selects the intermediate data B16, the processing unit 12 terminates the search for a combination of data conversion methods with respect to the group B.

The processing unit 12 determines a combination of data conversion methods that is able to convert the input data into the output data, on the basis of the results of the search carried out for the plurality of groups.

For example, when the processing unit 12 completes the search with respect to the groups A and B, the processing unit 12 selects the intermediate data A14 that is the minimum in evaluation value based on the evaluation function fA among the intermediate data A11 to A16 belonging to the group A. Similarly, the processing unit 12 selects the intermediate data B16 that is the minimum in evaluation value based on the evaluation function fB among the intermediate data B11 to B16 belonging to the group B.

The processing unit 12 selects one of the selected intermediate data A14 and B16, whichever is smaller in prescribed evaluation value, and takes the selected one as a start point for the next-stage search. For example, the prescribed evaluation value is a value that is obtained using an evaluation function F generated from the evaluation functions fA and fB corresponding to the groups A and B. As an example, the evaluation function F is a linear combination of the evaluation functions fA and fB (that is, F=a×fA+b×fB) (a and b are real constant values indicating weights).

For example, assuming that, out of the intermediate data A14 and B16, the intermediate data B16 is smaller in evaluation value based on the evaluation function F, the processing unit 12 takes the intermediate data B16 as a start point for the next-stage search. The processing unit 12 specifies a combination of the fifth and sixth data conversion methods for the input data X on the basis of the search results up to when the intermediate data B16 is obtained. The next-stage search is carried out using the intermediate data B16 as a base point (start point for this next-stage search) to search for a data conversion method following the specified combination.

The processing unit 12 repeatedly carries out the search in the group A and the search in the group B, with the intermediate data B16 as a start point, in the same manner as the search using the input data X as a start point. In the case where the output data Y is obtained as a result of applying any data conversion method to intermediate data, the data conversion method is taken as a final data conversion method. A combination of data conversion methods selected until the final data conversion method is obtained is a combination of data conversion methods that is able to convert the input data into the output data.

As described above, the search apparatus 10 receives input data and output data and classifies a plurality of data conversion methods into a plurality of groups. Then, with respect to each of the plurality of groups, the search apparatus 10 produces intermediate data from the input data using the data conversion methods belonging to the group and evaluates the intermediate data using an evaluation function corresponding to the group to search for a combination of data conversion methods within the group. Then, the search apparatus 10 determines a combination of data conversion methods that is able to convert the input data into the output data, on the basis of the search results obtained for the plurality of groups.

The above approach reduces the search time. That is, by limiting data conversion methods to be searched to data conversion methods belonging to groups, the search apparatus 10 is able to reduce the search space, compared with the case of searching all data conversion methods.

In addition, in the case of searching all data conversion methods, an evaluation function needs to be defined such as to be applicable to all the data conversion methods. However, as the types of data conversion methods increase, it becomes more difficult to appropriately define such an evaluation function. By contrast, by limiting data conversion methods to be searched to data conversion methods belonging to groups, it becomes possible to reduce the types of data conversion methods to which an evaluation function needs to be applied. This leads to simplifying the evaluation function, improving the accuracy of the evaluation function, and enhancing the possibility of selecting an appropriate path, in each group. As a result, it is possible to reduce search paths and the search time.

Second Embodiment

A second embodiment will now be described.

Figure 2:
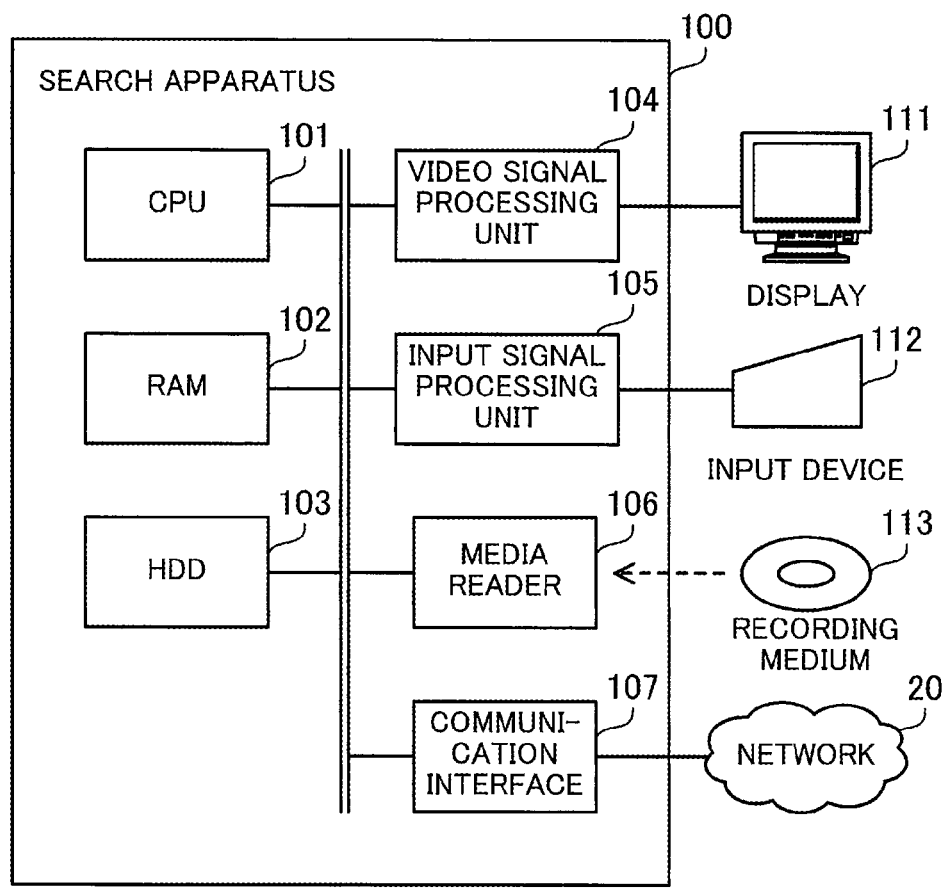
FIG. 2 is a block diagram illustrating an example of a hardware configuration of a search apparatus according to a second embodiment.

FIG. 2 is a block diagram illustrating an example of a hardware configuration of a search apparatus according to the second embodiment.

The search apparatus 100 includes a CPU 101, a RAM 102, an HDD 103, a video signal processing unit 104, an input signal processing unit 105, a media reader 106, and a communication interface 107. In this connection, the CPU 101 corresponds to the processing unit 12 of the first embodiment. The RAM 102 or HDD 103 corresponds to the storage unit 11 of the first embodiment.

The CPU 101 is a processor that executes program instructions. The CPU 101 loads at least part of a program and data from the HDD 103 to the RAM 102 and runs the program. In this connection, the CPU 101 may include a plurality of processor cores. Alternatively, the search apparatus 100 may include a plurality of processors. The processing to be described later may be performed in parallel using a plurality of processors or processor cores. In addition, a set of multiple processors may be called a "multiprocessor" or simply a "processor."

The RAM 102 is a volatile semiconductor memory device that temporarily stores therein programs to be executed by the CPU 101 and data to be used in operations by the CPU 101. Note that the search apparatus 100 may be provided with a different type of memory device other than RAM, or may be provided with a plurality of memory devices.

The HDD 103 is a non-volatile storage device that stores therein software programs, such as an operating system (OS), middleware, and application software, and data. Note that the search apparatus 100 may be provided with a different type of storage device, such as a flash memory or a solid state drive (SSD), or may be provided with a plurality of non-volatile storage devices.

The video signal processing unit 104 outputs images to a display 111 connected to the search apparatus 100 in accordance with commands from the CPU 101. The display 111 may be any type of display, such as a cathode ray tube (CRT) display, a liquid-crystal display (LCD), a plasma display, or an organic electro-luminescence (OEL) display.

The input signal processing unit 105 receives an input signal from an input device 112 connected to the search apparatus 100 and supplies the input signal to the CPU 101. Various types of input devices may be used as the input device 112, and for example, a pointing device, such as a mouse, a touch panel, a touchpad, or a trackball, a keyboard, a remote controller, or a button switch may be used. Plural types of input devices may be connected to the search apparatus 100.

The media reader 106 is a reading device for reading programs and data from a recording medium 113. The recording medium 113 may be, for example, a magnetic disk, an optical disc, a magneto-optical disk (MO), or a semiconductor memory device. Examples of magnetic disks include flexible disks (FDs) and HDDs. Examples of optical discs include compact discs (CDs) and digital versatile discs (DVDs).

The media reader 106 copies the programs and data read out from the recording medium 113 to a different recording medium, for example, the RAM 102 or the HDD 103. The read programs are executed, for example, by the CPU 101. Note that the recording medium 113 may be a portable recording medium and used to distribute the programs and data. The recording medium 113 and the HDD 103 are sometimes referred to as computer-readable recording media.

The communication interface 107 is connected to a network 20 and communicates with other computers over the network 20. The communication interface 107 may be connected to a communication device, such as a switch or router, with a cable.

The search apparatus 100 provides PBE functions. The PBE is a technique for generating a program without needing a user to perform programming. The search apparatus 100 uses the PBE functions to generate a program satisfying input and output conditions given by the user. For example, the search apparatus 100 generates a program for automatically performing data shaping on the basis of a few target processing examples. The following describes one method for generating a program (as an example for comparison with the search apparatus 100).

FIG. 3 illustrates an example of generating a program.

The following method is considered to generate a program on the basis of a processing example. First, the processing example is entered to an apparatus that generates a program (this apparatus is referred to as a generating apparatus). The processing example includes source data 31 and target data 32.

For example, the source data 31 is an RDB table and has the following columns: ID (identifier), Date and Time, and Entraining Station. The ID column contains the identification information of a user. The Date and Time column indicates when the user got on a train (month, day, hour, and minute). The Entraining Station column indicates a station where the user got on the train. In this connection, "0000" in the Entraining Station column indicates that any entraining station is not obtained yet.

The target data 32 is an RDB table and has the following columns: Date, Station Name, Gender, and Age. The Date column indicates a boarding date (month and day). The Station Name column indicates an entraining station. The Gender column indicates the user's gender. The Age column indicates the user's age.

In this connection, the source data 31 and target data 32 may be data other than RDB (for example, data in another format, such as comma-separated values (CSV) or Key-Value).

The generating apparatus uses, for example, an A* algorithm (or A* search algorithm) to determine a combination of data conversion methods (may be called conversion methods, simply) for converting source data into target data. The A* algorithm is one of algorithms that achieve efficient graph search.

More specifically, the generating apparatus creates a graph with nodes representing data and edges representing conversion methods for the data. A plurality of conversion methods are registered in the generating apparatus in advance. The generating apparatus applies each conversion method to the source data 31, which is taken as a start point, to produce intermediate data corresponding to the conversion method. If T or more conversion methods (T is an integer of two or greater) are registered, T pieces of intermediate data are produced. For example, in the case where three conversion methods a, b, and c are registered, the generating apparatus produces intermediate data by applying the conversion method a to the source data, intermediate data by applying the conversion method b to the source data, and intermediate data by applying the conversion method c to the source data. Then, the generating apparatus creates a graph in which a node (source node) representing the source data 31 is connected to each node (each intermediate node) representing one of the three pieces of intermediate data with an edge corresponding to a conversion method.

Then, the generating apparatus evaluates each produced intermediate data using a prescribed evaluation function, and selects a conversion method to be applied to the source data 31. The evaluation function gives an evaluation value to each intermediate data. The evaluation value is an estimated distance or estimated cost of a path from the source data 31 via the intermediate data to the target data 32. Assuming that the evaluation value of the intermediate data corresponding to the conversion method c is the minimum among the three pieces of intermediate data corresponding to the conversion methods a, b, and c, the generating apparatus selects the intermediate data (node) corresponding to the conversion method c. The generating apparatus further applies each of the conversion methods a, b, and c to the selected intermediate data to produce three pieces of intermediate data, evaluates the three pieces of intermediate data using the evaluation function, and selects intermediate data among the three pieces of produced intermediate data.

The generating apparatus repeats the above process. When the target data 32 is obtained, the process is completed, and a graph 33 representing a path from the source node to a node (target node) corresponding to the target data 32 is obtained. After that, the generating apparatus obtains, from the graph 33, a combination of conversion methods corresponding to a combination of edges belonging to the path from the source node to the target node. The generating apparatus generates a program 34 on the basis of the obtained combination of conversion methods.

For example, the program 34 includes the following conversion methods: "supplemental data join," "null replacement," "column split," "column deletion," and "column movement." The supplemental data join is to join the source data 31 and supplemental data. The supplemental data indicates an association among ID, user's gender, and age. The null replacement is to replace "0000" of the source data 31 with null. The column split is to split the Date and Time column of the source data 31 into a Date (month and date) column and a Time (hour and minute) column. The column deletion is to delete the ID and Time columns. The column movement is to move columns so as to match the column arrangement of the target data 32.

When receiving source data 35 thereafter, the generating apparatus uses the program 34 to produce target data 36 from the source data 35.

The following describes a distance between nodes.

Figure 4:
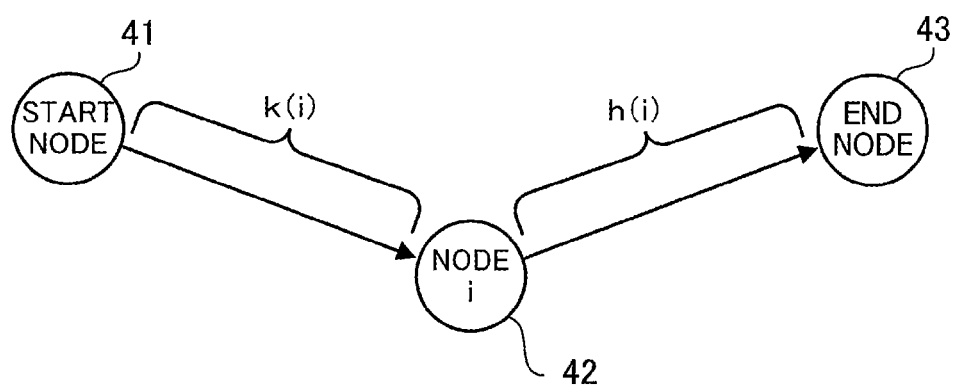
FIG. 4 illustrates an example of a distance.

FIG. 4 illustrates an example of a distance.

A start node 41 corresponds to the source data 31. A node 42 is a node (intermediate node) corresponding to intermediate data. Assume now that the identifier of the node 42 or intermediate data is i. A node (intermediate data) with an identifier of i may be referred to as a node i (intermediate data i). An end node 43 corresponds to the target data 32.

In this case, an evaluation function for the node i (that is, intermediate data i) is expressed as "$k(i)+h(i)$." The "$k(i)$" represents an estimated shortest distance from the start node to the node i. The "h(i)" represents an estimated distance from the node i to the end node. For example, efficient search is achieved by selecting a node that has a minimum value of k(i)+h(i).

In the search method exemplified in FIG. 3, however, the more the number of conversion methods T to be used, the more the number of combinations of conversion methods and the higher a processing cost for the search. More specifically, the search space increases by the exponent (power) of T. If the search space is large, a huge amount of rework may be needed even if the search is carried out according to values of an evaluation function. If so, the search time lengthens. By contrast, the search apparatus 100 provides a function for reducing the search time.

Figure 5:
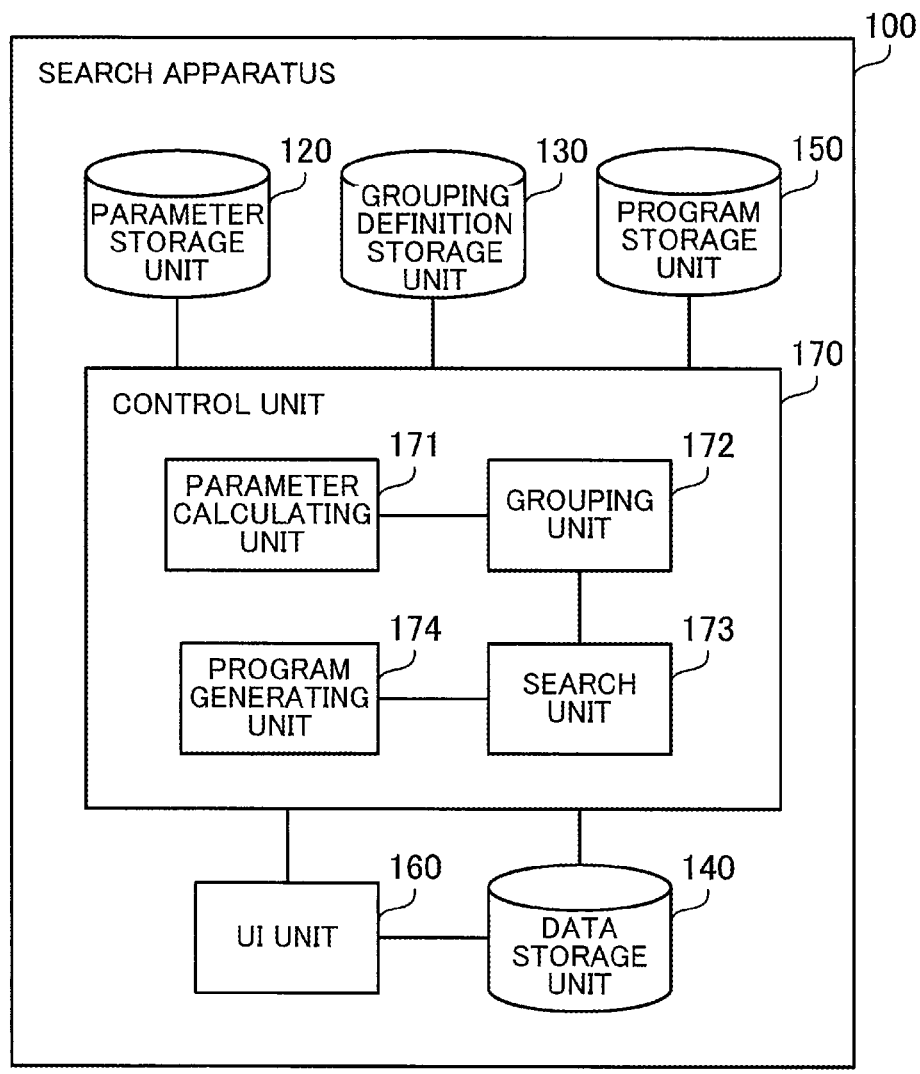
FIG. 5 is a block diagram illustrating an example of functions of the search apparatus.

FIG. 5 is a block diagram illustrating an example of functions of the search apparatus.

The search apparatus 100 includes a parameter storage unit 120, a grouping definition storage unit 130, a data storage unit 140, a program storage unit 150, a user interface (UI) unit 160, and a control unit 170. The parameter storage unit 120, grouping definition storage unit 130, data storage unit 140, and program storage unit 150 are implemented by using a memory space saved in the RAM 102 or HDD 103, for example. The UI unit 160 and control unit 170 are implemented by using programs, for example.

The parameter storage unit 120 stores therein a prescribed parameter for use in a search process. The parameter has a value α that is calculated based on results of past search processes. The parameter α is used for determining the number of groups (hereinafter, referred to as a group count) for conversion methods.

The grouping definition storage unit 130 stores therein a grouping pattern table to be used as criteria for classifying a plurality of conversion methods into groups. The grouping pattern table is information indicating patterns for the classification of the conversion methods into groups.

The data storage unit 140 stores therein data processing examples entered by a user. A processing example includes source data and target data. The source data is an example of input data. The target data is an example of output data. The data storage unit 140 stores therein intermediate data produced from the source data by the control unit 170.

The program storage unit 150 stores therein a conversion program generated by the control unit 170. The conversion program stored in the program storage unit 150 is used to convert other source data into other target data.

The UI unit 160 receives source data and target data entered by the user and stores them in the data storage unit 140. For example, the UI unit 160 may receive the source data and target data entered using the input device 112 by the user. Alternatively, the UI unit 160 may receive the source data and target data from another computer over the network 20.

The UI unit 160 receives source data and specification of a conversion program, causes the search apparatus 100 to run or stop the specified conversion program or causes the display 111 to display target data generated from the source data with the conversion program.

The control unit 170 controls PBE performed by the search apparatus 100. The control unit 170 includes a parameter calculating unit 171, a grouping unit 172, a search unit 173, and a program generating unit 174.

The parameter calculating unit 171 obtains a representative value of the parameter α from a history of actual values of the parameter α stored in the parameter storage unit 120, and notifies the grouping unit 172 of the representative value. As the representative value, for example, an average or intermediate value of recent M values (M is an integer of two or greater) of the parameter α may be considered.

The grouping unit 172 calculates a group count for conversion methods on the basis of the parameter α received from the parameter calculating unit 171, and classifies a plurality of conversion methods into a plurality of groups.

With respect to each of the groups generated by the grouping unit 172, the search unit 173 produces intermediate data from source data using conversion methods belonging to the group. The search unit 173 specifies a combination of conversion methods that is able to convert the source data into the target data, using the result of the grouping.

The program generating unit 174 generates a conversion program that is able to convert the source data into the target data on the basis of the combination of conversion methods specified by the search unit 173. The program generating unit 174 stores the generated program in the program storage unit 150.

Figure 6:
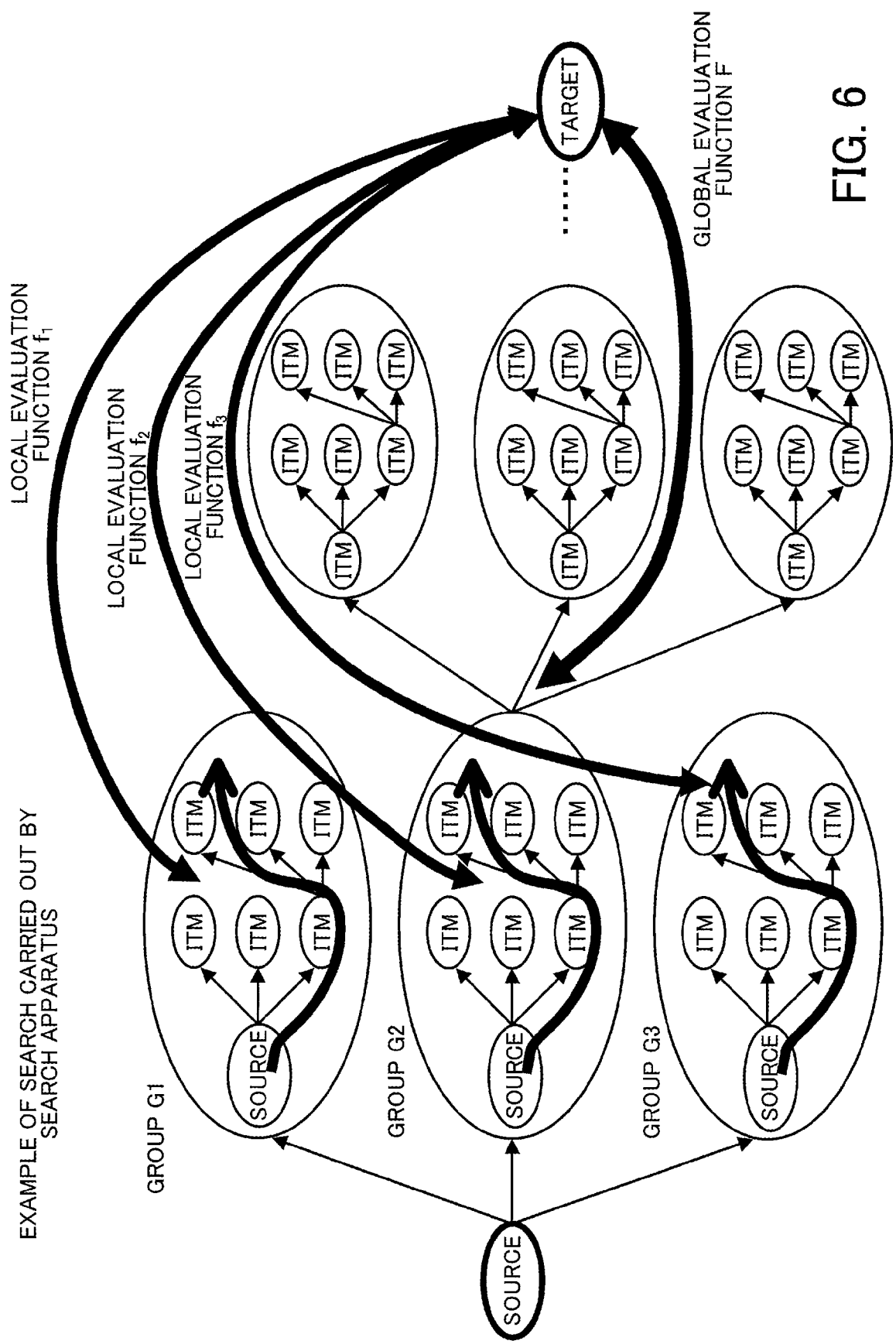
FIG. 6 illustrates an example of a search carried out by the search apparatus.

FIG. 6 illustrates an example of a search carried out by the search apparatus.

Assume, for example, that the grouping unit 172 classifies a plurality of conversion methods into three groups G1, G2, and G3. The search unit 173 carries out a path search of a graph according to an A* algorithm, for each group. At this time, the search unit 173 uses a unique local evaluation function as an evaluation function for each group. A local evaluation function $f_1$ is used for the group G1, a local evaluation function $f_2$ is used for the group G2, and a local evaluation function $f_3$ is used for the group G3.

Assume now that a node corresponding to source data is called a source node, a node corresponding to a target data is called a target node, and nodes corresponding to intermediate data are called intermediate nodes (ITM).

For example, with respect to the conversion methods belonging to the group G1, the search unit 173 searches for a path with the source node as a start point using the local evaluation function $f_1$. A combination of edges included in the path corresponds to a combination of conversion methods. Further, with respect to the conversion methods belonging to the group G2, the search unit 173 searches for a path with the source node as a start point using the local evaluation function $f_2$. Still further, with respect to the conversion methods belonging to the group G3, the search unit 173 searches for a path with the source node as a start point using the local evaluation function $f_3$.

In the case where the target data does not occur in any group as a result of carrying out the search a prescribed number of times for each group, the search unit 173 selects an intermediate node that has a minimum local evaluation value among the intermediate nodes generated by the current search in each group, as a final node of the group. The search unit 173 then evaluates the final nodes of the groups using a global evaluation function F. The global evaluation function F is a function that provides, as an evaluation value, an estimated distance from the source node via the selected intermediate node to the target node. Unlike the local evaluation functions $f_1$, $f_2$, and $f_3$, the global evaluation function F is applicable to all conversion methods. For example, a global evaluation function F(i) for a node i is expressed as the following equation (1), where n (n is an integer of zero or grater) denotes the identification number of a group.

$$F(i) = \sum_{n=0}^{j} \lambda_n f_n(i) \qquad (1)$$

Here, the "j" denotes a maximum value for the identification numbers of groups (the group count is j+1). The "$f_n$" denotes a local evaluation function. The "$\lambda_n$" denotes a weight to be given to a local evaluation value for a corresponding group. That is, the global evaluation function F is expressed as the weighted sum of evaluation values based on the local evaluation functions corresponding to the groups (a weight for each local evaluation function is set in advance). For example, the search unit 173 selects a final node $i_g$ that has the minimum global evaluation value F among the final nodes of the groups, as a start node for the next-stage search.

The search unit 173 repeats the above process, and when obtaining the target data, completes the search.

In this connection, the group count used in the search by the search unit 173 is determined by the parameter calculating unit 171 and grouping unit 172 in advance.

Figure 7:
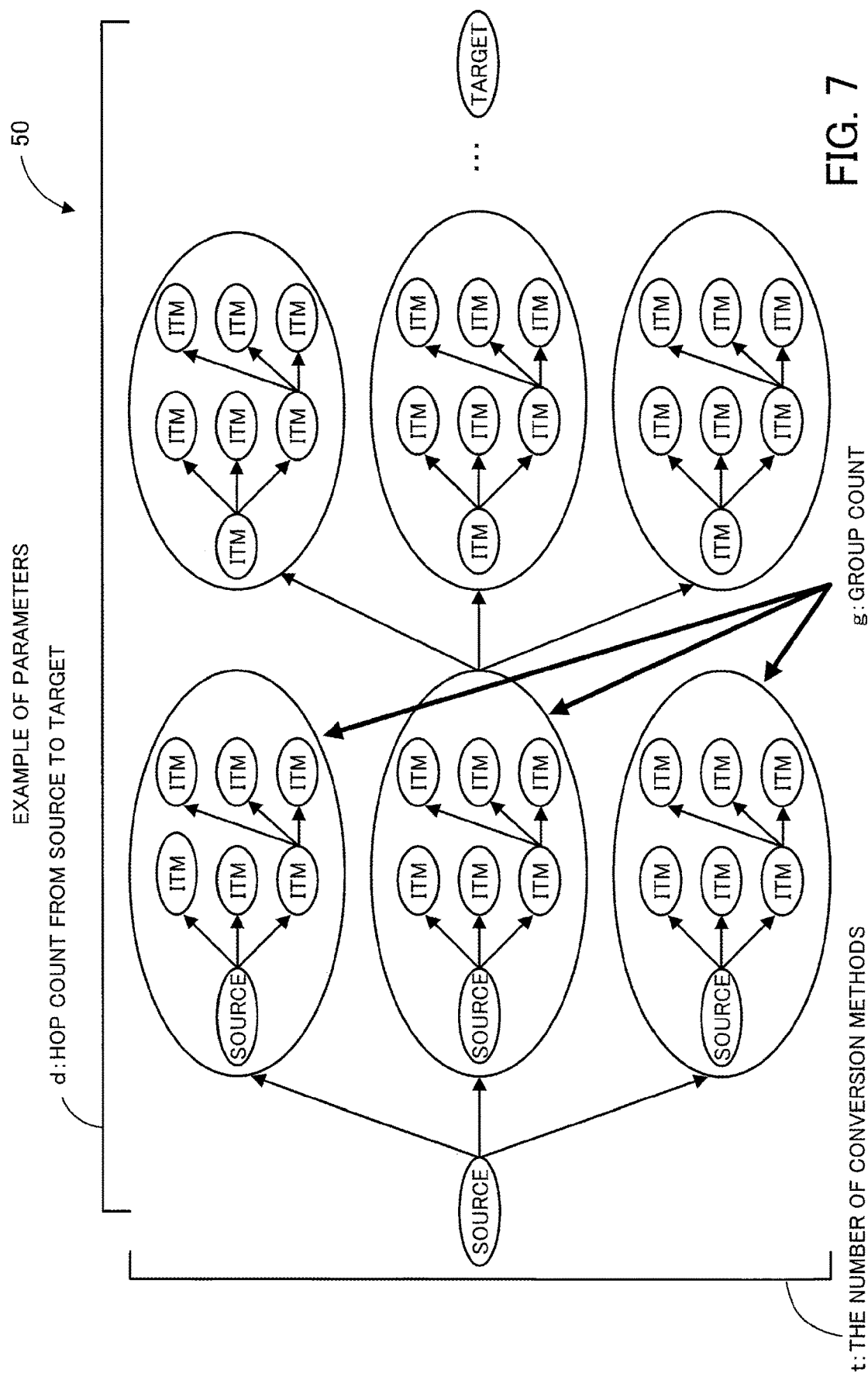
FIG. 7 illustrates an example of parameters.

FIG. 7 illustrates an example of parameters.

A graph 50 represents search paths that the search apparatus 100 traces from source data to target data.

The parameter calculating unit 171 determines a group count $g_{opt}$ that achieves a minimum search space reduction rate R(g), and classifies conversion methods into groups according to the group count $g_{opt}$. The search space reduction rate R(g) is expressed as the following equation (2).

$$R(g) = (g^g \cdot (t/g)^{d/g})/t^d \quad (2)$$
$$= g^{(g-d/g)} \cdot t^{(d/g-d)}$$

Here, the "g" denotes the group count, the "t" denotes the number of conversion methods, and "d" denotes the number of hops (hereinafter, a hop count) from a source node to a target node.

Figure 8:
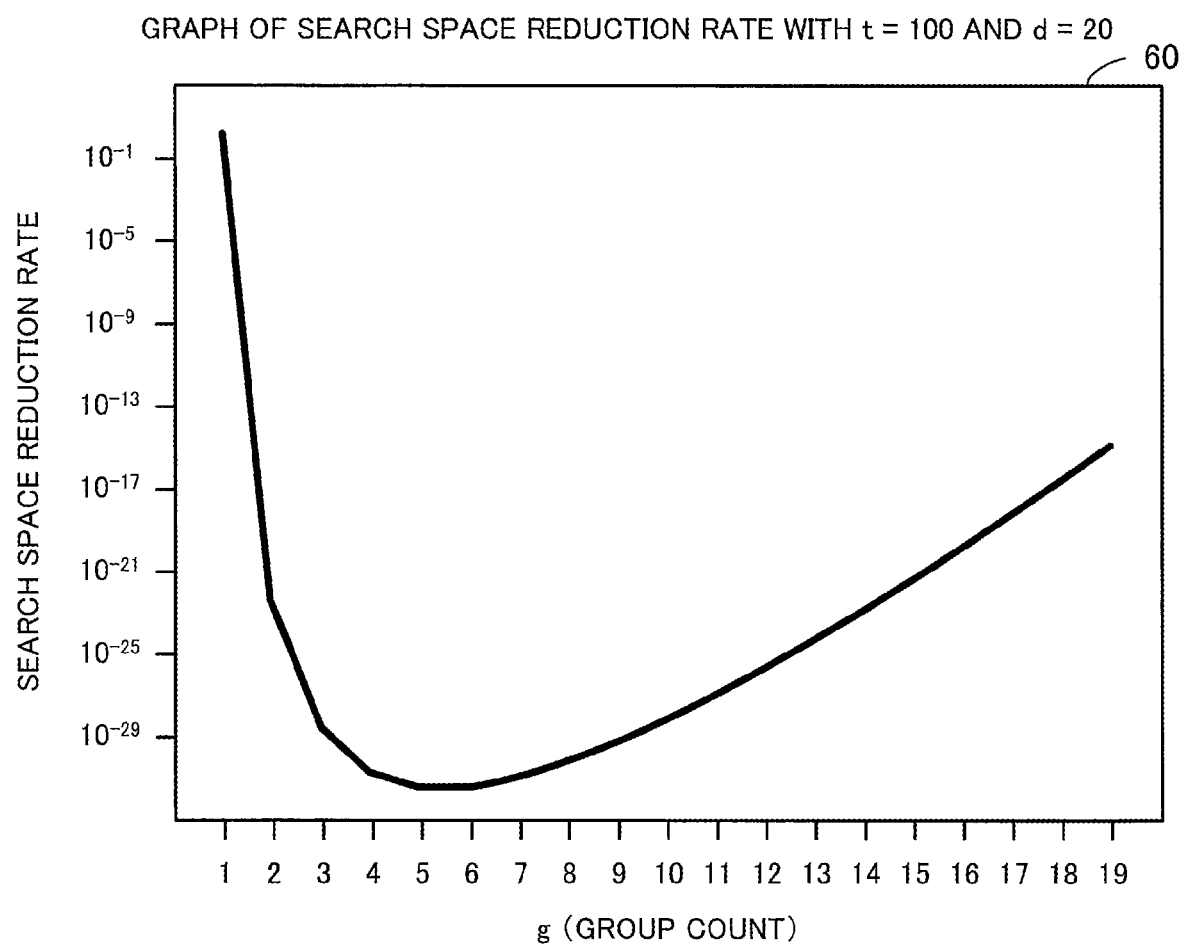
FIG. 8 illustrates a graph representing a search space reduction rate.

FIG. 8 illustrates a graph representing a search space reduction rate.

As an example, a graph 60 represents a search space reduction rate R(g) in the case of t=100 and d=20. The grouping unit 172 calculates a minimum search space reduction rate R(g) with the Newton's method, for example, and calculates a value $g=g_{opt}$ as a group count. Alternatively, the grouping unit 172 may calculate a search space reduction rate R(g) with respect to each "g" value satisfying 1<g<t, and obtain a "g" value that provides the minimum value of the search space reduction rates R(g), as the group count $g_{opt}$.

Referring to the example of FIG. 8, $g_{opt}$=5 is obtained. By selecting the group count $g_{opt}$ that provides a minimum search space reduction rate R(g) in this way, the grouping unit 172 is able to greatly reduce the search space in the search process (to be described below).

In this connection, the "t" denotes the number of prepared conversion methods and is therefore a known value. The hop count d is unknown in the current search and therefore an estimated value is used. More specifically, the estimated value $d_{est}$ for the hop count d is considered to be proportional to an estimated distance between a source node and a target node. Therefore, the grouping unit 172 calculates the estimated value $d_{est}$ with the following equation (3).

$$d_{est} = \alpha \cdot h(i_0) \quad (3)$$

Here, the "$i_0$" denotes a source node. The parameter $\alpha$ is a representative value (for example, average value, intermediate value, or another) for actual values $d_{real}$ of the hop count d in recent M searches. When the search unit 173 obtains an actual value $d_{real}$ as a result of the current search, the search unit 173 stores the parameter value $\alpha = d_{real}/h(i_0)$ (the current a value) in the parameter storage unit 120.

Figure 9:
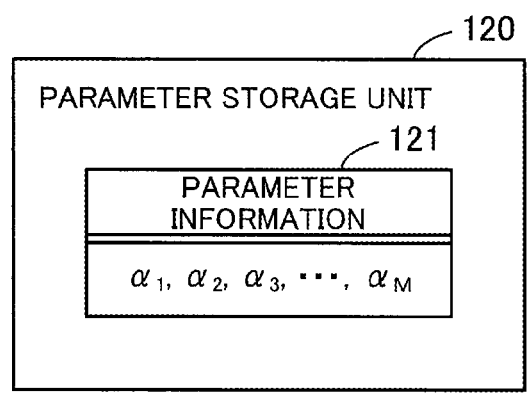
FIG. 9 illustrates an example of parameter information.

FIG. 9 illustrates an example of parameter information.

Parameter information 121 includes calculated values ($\alpha = \alpha_1, \alpha_2, \alpha_3, \ldots, \alpha_M$) of the parameter $\alpha$ that are calculated based on the actual values $d_{real}$ of the hop count from the source node to the target node in the recent M searches. When a search is carried out on a new processing example, a value of this parameter $\alpha$ is calculated based on the search result and added to the parameter information 121. When a new value of the parameter $\alpha$ is added, the first stored value of the parameter $\alpha$ may be removed from the parameter information 121.

FIG. 10 illustrates an example of a grouping pattern table. The grouping pattern table 131 indicates patterns for classifying conversion methods into groups according to group counts $g_{opt}$. The grouping pattern table 131 includes the following columns: Conversion Method, $g_{opt}$=1, $g_{opt}$=2, $g_{opt}$=3, $g_{opt}$=4, . . . .

The Conversion Method column contains the identification name of a conversion method. The $g_{opt}$=1 column contains the group number of a group to which the conversion method belongs in the case where the group count is "1." The $g_{opt}$=2 column contains the group number of a group to which the conversion method belongs in the case where the group count is "2." The same applies to the $g_{opt}$=3 column and subsequent columns.

For example, the grouping pattern table 131 includes a record with a conversion method of "string conversion," a group number of "1" for $g_{opt}$=1, and a group number of "1" for $g_{opt}$=2. This record indicates that the conversion method "string conversion" belongs to a group with group number "1" in the case where the group count is "1," and to a group with group number "1" in the case where the group count is "2."

In addition, the grouping pattern table 131 includes a record with a conversion method of "schema conversion," a group number "1" for $g_{opt}$=1, and a group number "2" for $g_{opt}$=2. This record indicates that the conversion method "schema conversion" belongs to the group with group number "1" in the case where the group count is "1," and to a group with group number "2" in the case where the group count is "2."

As described above, the grouping pattern table 131 registers therein group numbers corresponding to group counts $g_{opt}$ with respect to each conversion method. The grouping pattern table 131 registers therein such grouping patterns as to preferentially classify conversion methods having a common evaluation function into the same group. That is, to simplify a local evaluation function corresponding to each group improves the accuracy of evaluation using the local evaluation function and reduces the search time.

However, the grouping based on the grouping pattern table 131 may classify a first data conversion method and a second data conversion method having different evaluation functions into the same group. In this case, the search unit 173 calculates a local evaluation function corresponding to the group, on the basis of the first evaluation function corresponding to the first data conversion method and the second evaluation function corresponding to the second data conversion method. For example, the weighted sum of the first and second evaluation functions is taken as a local evaluation function for the group. Similarly, with respect to three or more evaluation functions, their weighted sum is used as a local evaluation function.

The following describes how the search apparatus 100 operates.

Figure 11:
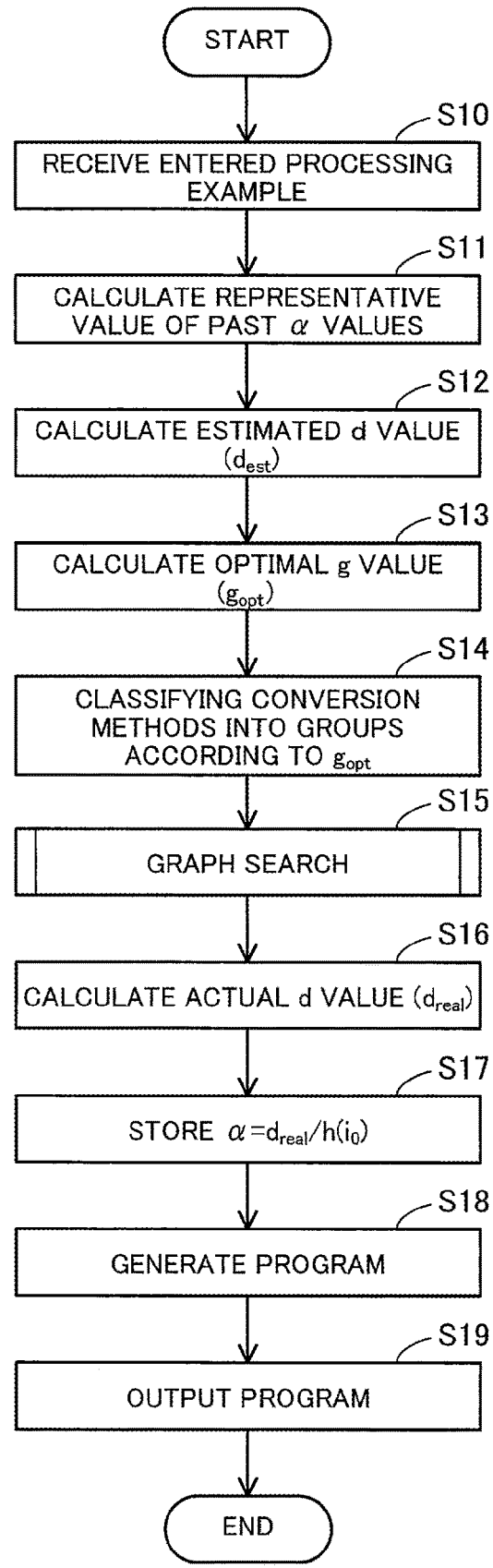
FIG. 11 is a flowchart illustrating how to generate a program.

FIG. 11 is a flowchart illustrating how to generate a program.

(S10) The UI unit 160 receives a processing example entered by a user. The processing example includes source data and target data.

(S11) The parameter calculating unit 171 calculates a representative value of past a values with reference to the parameter information 121 stored in the parameter storage unit 120.

(S12) The parameter calculating unit 171 calculates an estimated d value ($d_{est}$) with the equation (3).

(S13) The grouping unit 172 calculates an optimal g value ($g_{opt}$). More specifically, the grouping unit 172 substitutes the t value and $d=d_{est}$ in the equation (2) to obtain the equation of R(g), and then obtains the optimal g value ($g_{opt}$) that provides a minimum R(g) value.

(S14) The grouping unit 172 classifies conversion methods into groups according to the $g_{opt}$ value. The grouping unit 172 refers to the grouping pattern table 131 stored in the grouping definition storage unit 130 to specify a group to which each conversion method is classified according to the $g_{opt}$ value, and classifies the conversion methods to the specified groups.

(S15) The search unit 173 searches for a graph. This graph search will be described in detail later.

(S16) The search unit 173 calculates an actual d value ($d_{real}$) from the result of step S15. More specifically, the search unit 173 counts the hop count (the number of edges) from the source node to the target node and takes this hop count as the $d_{real}$ value.

(S17) The search unit 173 stores the parameter value $\alpha = d_{real}/h(i_0)$ in the parameter information 121. At this time, the search unit 173 may remove the first stored α value from the parameter information 121.

(S18) The program generating unit 174 generates a program that converts the source data into the target data, on the basis of the result of the graph search obtained at step S15.

(S19) The program generating unit 174 outputs the generated program. The program generating unit 174 stores the generated program in the program storage unit 150. The program stored in the program storage unit 150 is usable to convert other source data. Then, the program generation is completed.

As seen from steps S11 to S13, the grouping unit 172 determines a group count $g_{opt}$ using an index value ($d_{est}$) indicating a distance between the source data (input data) and the target data (output data). More specifically, the parameter calculating unit 171 calculates a parameter α representing a relationship among the number of data conversion methods used to convert other source data (other input data) into other target data (other output data) and other index values (past actual values) indicating distances between the other source data and the other target data. The grouping unit 172 determines the group count $g_{opt}$ using the index value representing the distance between the source data and the target data and the parameter α. A group count that provides a minimum search space reduction rate R(g) is obtained as the group count $g_{opt}$.

Figure 12:
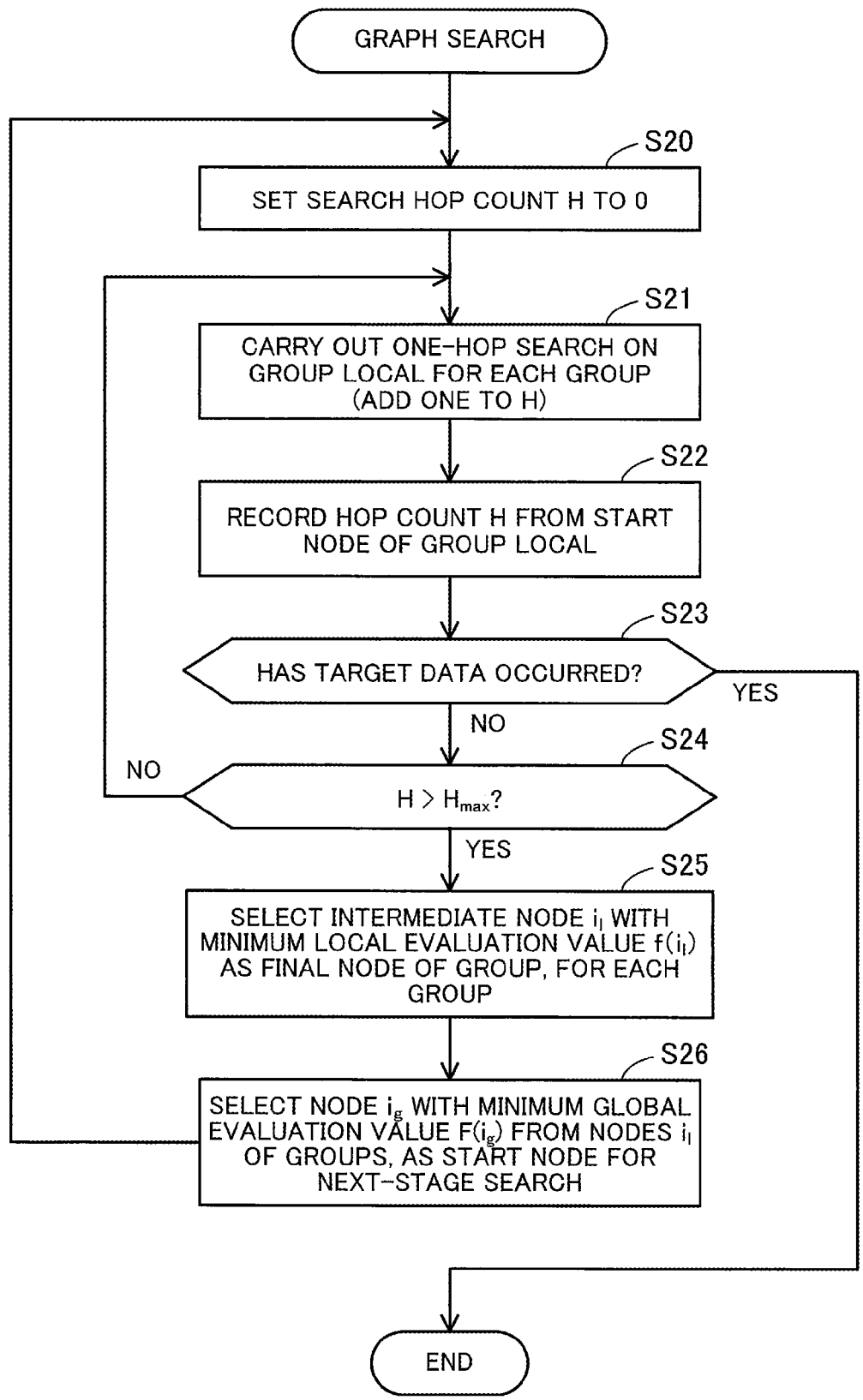
FIG. 12 is a flowchart illustrating how to perform a graph search.

FIG. 12 is a flowchart illustrating how to perform a graph search. This graph search is executed in step S15.

(S20) The search unit 173 sets a search hop count H to zero.

(S21) The search unit 173 carries out a one-hop search on a group local with respect to each group. The search unit 173 adds one to H. Conversion methods belonging to a group are searched in a group local search for the group. Conversion methods that do not belong to the group are not used in the group local search. In the case where n conversion methods (n is an integer of two or greater) belong to the group, the search unit 173 generates n pieces of intermediate data in the group by applying the conversion methods to the data corresponding to the current node. In addition, the search unit 173 evaluates the n pieces of intermediate data using the local evaluation function corresponding to the group and selects a conversion method on the basis of the evaluation results.

In this connection, conversion methods associated with different evaluation functions may be classified into the same group as a result of the grouping of step S14. In this case, the search unit 173 sets the weighted sum of the evaluation functions of the conversion methods as the local evaluation function corresponding to the group (weights are preset).

(S22) The search unit 173 records the hop count H counted from the start node of the group local.

(S23) The search unit 173 determines whether the target data has occurred with any conversion method. If the target data has occurred, the graph search is completed. If the target data has not occurred, the process proceeds to step S24.

(S24) The search unit 173 determines whether the hop count H is greater than a threshold $H_{max}$ ($H > H_{max}$). If $H > H_{max}$, the process proceeds to step S25. If $H \leq H_{max}$, then the process proceeds to step S21.

(S25) With respect to each group, the search unit 173 selects an intermediate node $i_1$ that has a minimum local evaluation value $f(i_1)$ as the final node of the group.

(S26) The search unit 173 selects a node $i_g$ that has a minimum global evaluation value $F(i_g)$ from the nodes $i_1$ of the groups, as a start node for the next-stage search. Then, the process proceeds to step S20.

As described above, with respect to each group, the search unit 173 generates intermediate data using the conversion methods belonging to the group, and evaluates the intermediate data using the local evaluation function corresponding to the group. By doing so, the search unit 173 searches for a combination of conversion methods.

In this connection, the search unit 173 possibly does not reach the target data (output data) from the source data (input data) through any search of the plurality of groups. In this case, the search unit 173 extracts representative intermediate data from intermediate data generated by the search on each of the plurality of groups. Then, the search unit 173 evaluates the representative intermediate data of each group using a common evaluation function (global evaluation function), which is different from the evaluation functions (local evaluation functions) corresponding to the plurality of groups, and selects the representative intermediate data of one group. The search unit 173 then searches each group with the selected representative intermediate data as a base point (that is, a start point for the next-stage search), in place of the source data.

In this connection, among intermediate data produced in a group, intermediate data that is the highest in evaluation based on the local evaluation function corresponding to the group is taken as the representative intermediate data of the group. In this example, the "highest in evaluation" means that an evaluation value indicating a distance is the minimum. In this way, evaluation targets for the global evaluation function are narrowed down, so that evaluation using the global evaluation function is executed efficiently.

Figure 13:
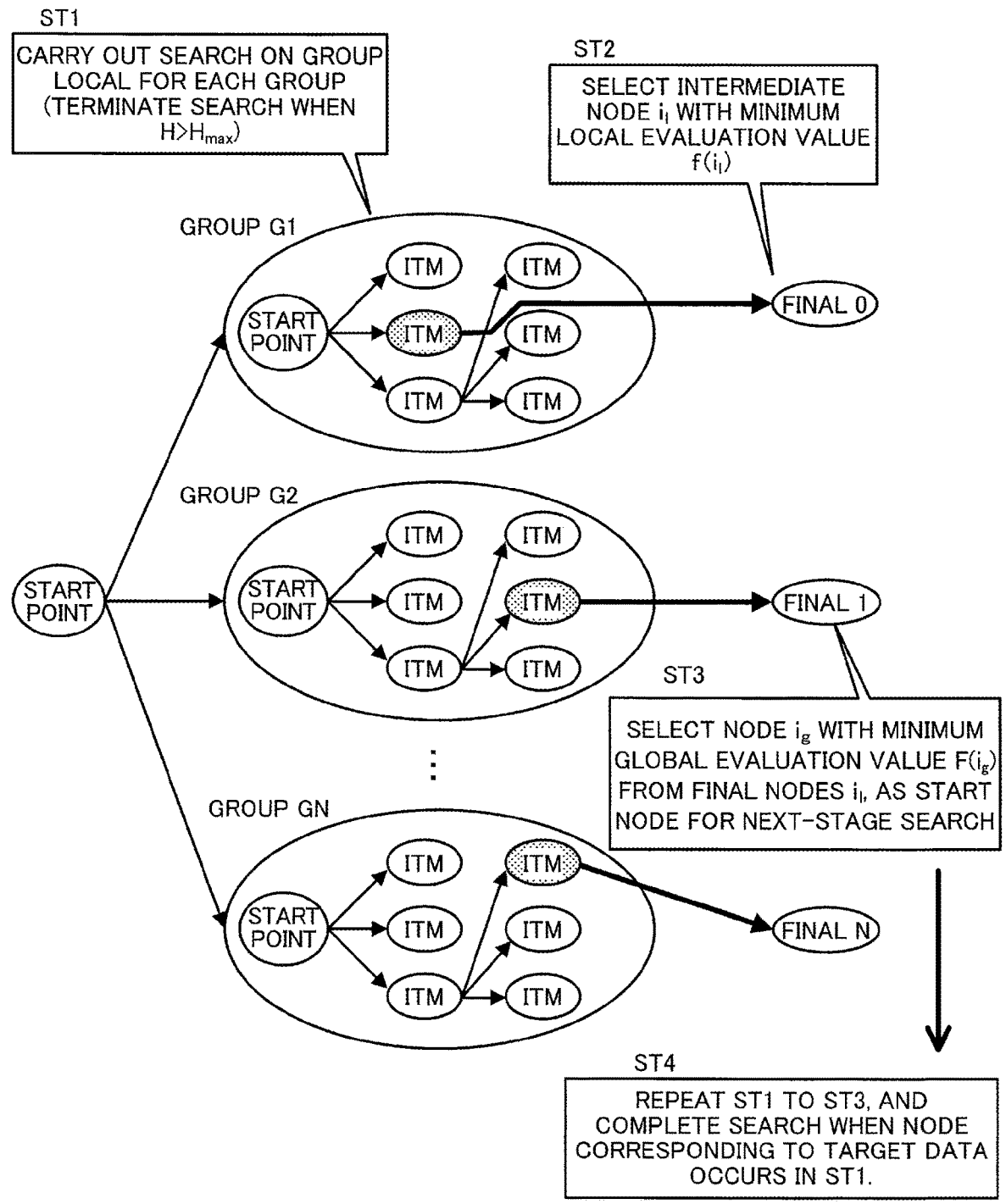
FIG. 13 illustrates a specific example of performing the graph search.

FIG. 13 illustrates a specific example of performing the graph search.

The example of FIG. 13 indicates a procedure for one cycle of steps S20 to S26 of FIG. 12. Assume now that conversion methods are classified into N groups G1, G2, . . . , and GN.

The search unit 173 carries out a search on group local with respect to each group (step ST1). The search in each group is repeated until target data occurs or hop count H>threshold $H_{max}$ is satisfied. When H>threshold $H_{max}$ is satisfied, the search is terminated even if the target data does not occur.

Assume that H>threshold $H_{max}$ is satisfied before the target data does not occur in any group G1, G2, . . . , GN. In this case, with respect to each group, the search unit 173 selects an intermediate node $i_1$ that has a minimum local evaluation value $f(i_1)$ as the final node of the group (step ST2). In FIG. 13, intermediate nodes selected as final nodes among the intermediate nodes for the groups G1, G2, . . . , and GN are indicated by hatching. Since one final node is selected for each group, N final nodes exist.

The search unit 173 selects a node $i_g$ that has a minimum global evaluation value $F(i_g)$ from the final nodes $i_1$, as a start node for the next-stage search (step ST3).

The search unit 173 repeats steps ST1 to ST3 until the target data occurs in the search of step ST1, and when a node corresponding to the target data occurs in step ST1, the search is completed (step ST4).

As described above, the search apparatus 100 classifies a plurality of conversion methods into a plurality of groups, and carries out a search in each group. By limiting conversion methods to be searched in a group to conversion methods belonging to the group as described above, it becomes possible to reduce the search space, compared with the case of searching all data conversion methods, and thus to reduce the search time. Especially, by selecting with the equation (2) a group count that leads to a minimum search space reduction rate, it becomes possible to greatly reduce the search space.

Note that, in the case of searching all conversion methods, an evaluation function needs to be defined such as to be applicable to all the data conversion methods. Therefore, as the types of conversion methods increase, it becomes more difficult to appropriately define such an evaluation function. By contrast, by limiting conversion methods to be searched to conversion methods belonging to groups, it becomes possible to reduce the types of conversion methods to which an evaluation function needs to be applied. This leads to simplifying the evaluation function, improving the accuracy of the evaluation function, and enhancing the possibility of selecting an appropriate path, in each group. As a result, it is possible to reduce search paths and the search time.

In the above explanation, grouping is done according to the group count $g_{opt}$ with reference to the grouping pattern table 131 of FIG. 10. Alternatively, the grouping may be done in another way. For example, the grouping unit 172 classifies conversion methods into groups on the basis of the degree of dissimilarity between two conversion methods (or the degree of similarity). In this case, the following dissimilarity table may be used.

FIG. 14 illustrates an example of a dissimilarity table.

The dissimilarity table 132 is stored in the grouping definition storage unit 130 in advance. The dissimilarity table 132 registers therein the degree of dissimilarity between every pair of conversion methods. A higher dissimilarity value indicates that conversion methods are more dissimilar. In other words, a smaller dissimilarity value indicates that conversion methods are more similar.

For example, a dissimilarity between a pair of string extraction and string conversion is "10," which indicates a relatively low dissimilarity. Therefore, the paired string extraction and string conversion are said to be relatively similar. On the other hand, a dissimilarity between a pair of string conversion and table join is "150," which indicates a relatively high dissimilarity. Therefore, the paired string conversion and table join are said to be relatively not similar.

As described above, a smaller dissimilarity value indicates a higher similarity. That is to say, the dissimilarity table 132 is said to be information representing a similarity between conversion methods.

Figure 15:
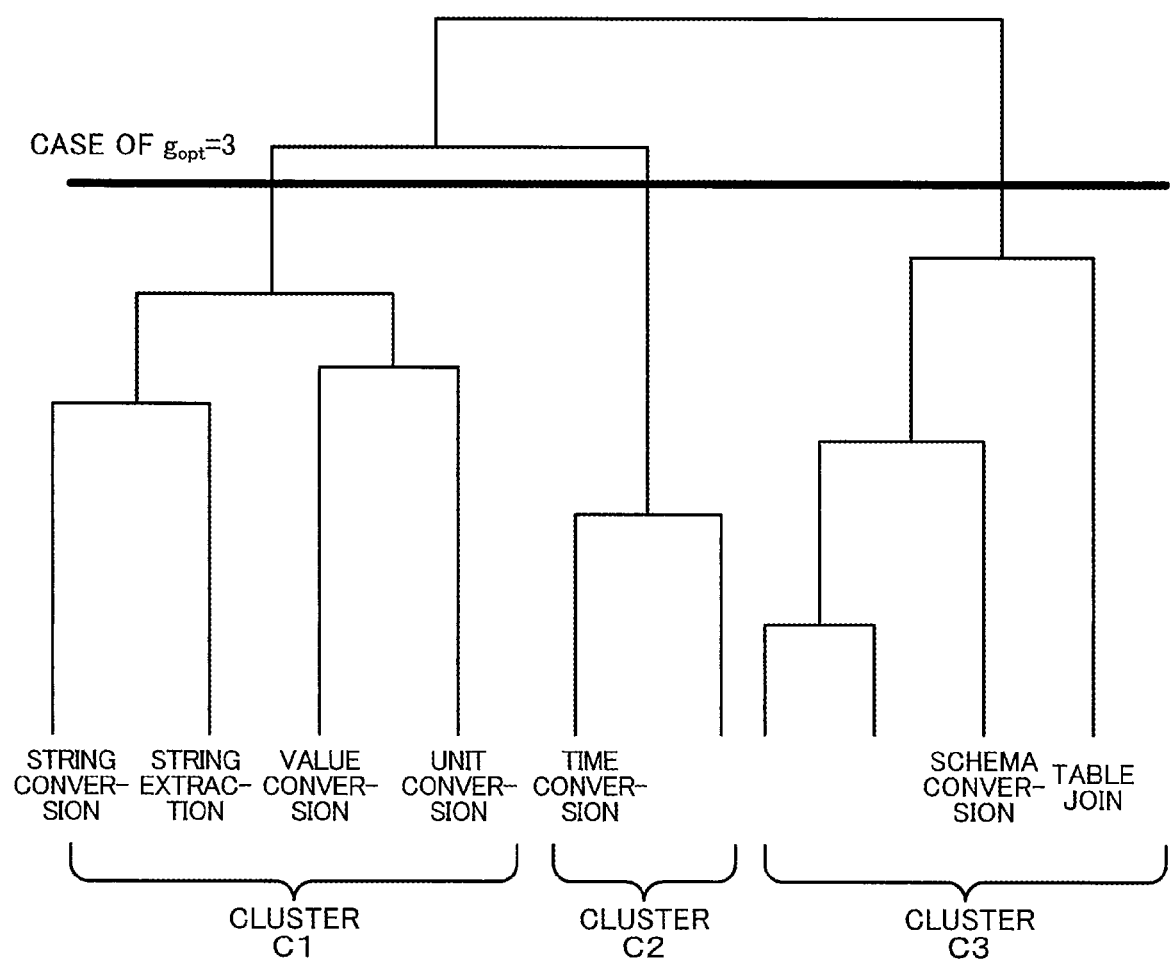
FIG. 15 illustrates an example of grouping based on the dissimilarity table.

FIG. 15 illustrates an example of grouping based on the dissimilarity table.

The grouping unit 172 performs hierarchical clustering with reference to the dissimilarity table 132 to obtain groups into which conversion methods are classified according to an obtained group count $g_{opt}$. The grouping unit 172 accesses the grouping definition storage unit 130 to group similar conversion methods in order so as to classify the conversion methods into as many groups as the group count $g_{opt}$. As a method for such hierarchical clustering, the Ward method may be used. For example, in the case of the group count $g_{opt}=3$, the grouping unit 172 classifies string conversion, string extraction, value conversion, unit conversion into a cluster C1, time conversion into a cluster C2, and schema conversion and table join into a cluster C3. The clusters C1, C2, and C3 each correspond to one group.

As described above, the grouping unit 172 may classify a plurality of data conversion methods on the basis of the degrees of similarity (or dissimilarity) between every two of the plurality of conversion methods, at step S14 of FIG. 11.

The following describes an example of how to calculate local evaluation values using local evaluation functions and global evaluation values using a global evaluation function.

FIGS. 16A and 16B illustrate examples of source data and target data.

FIG. 16A illustrates source data 141. The source data 141 is an RDB table that has the following columns: Item, Price, and Quantity. The Item column contains the name of a product. The Price column contains the unit price of the product. The Quantity columns contains the quantity of the product.

For example, the source data 141 has a record with Item of "apple(China)," Price of "100," and Quantity of "50." In addition, the source data 141 has a record with Item of "orange Brazil," Price of "200," and Quantity of "100."

FIG. 16B illustrates target data 142. The target data 142 is an RDB table that has the following columns: Item, Region, and Sale(incl.tax) ("incl." stands for including). The Item column contains the name of a product, the Region column contains the producing area of the product, and the Sale(incl.tax) column contains the price for the quantity of the product (price with tax included).

For example, the target data 142 has a record with Item of "apple," Region of "China," and Sale(incl.tax) of "5400." In addition, the target data 142 has a record with Item of "orange," Region of "Brazil," and Sale(incl.tax) of "21600."

The following describes a plurality of conversion methods that are classified into two groups G1 and G2.

As examples of conversion methods to be classified into the group G1, the following string extraction will be considered.

A first method is for extracting a term following a P-th (P is an integer) delimiter (space, tab, or comma). For example, in the case of P=1 (a term following a first delimiter is to be extracted), the search unit 173 extracts "in" from data "made in Japan" and adds it to a new column.

A second method is for extracting a P-th term that starts with a non-alphabetic character. For example, in the case of P=1 (a first term that starts with a non-alphabetic character is to be extracted), the search unit 173 extracts "(100 g)" from data "Sugar (100 g)" and adds it to a new column.

As examples of conversion methods to be classified into the group G2, value conversion using addition and value conversion using product will be considered. For example, in the case of a value "100" and a value "200," the value conversion using addition adds them to get "300," which is then added to a new column. In the case of a value "100" and a value "200," the value conversion using product calculates their product to get "20000," which is then added to a new column.

Other examples of the string extraction includes a method for extracting a P-th value string and a method for extracting a P-th term that starts with a capital alphabetic character. In the former method, for example, in the case of P=1 (a first value string is to be extracted), "100" is extracted from data "Sugar (100 g)," and is added to a new column. In the latter method, for example, in the case of P=1 (a first term that starts with a capital alphabetic character is to be extracted), "Japan" is extracted from data "made in Japan" and is added to a new column. In addition, other examples of the value conversion include value conversion using a difference or quotient.

The following describes examples of intermediate data and examples of calculating a local evaluation value with respect to each of the groups G1 and G2. In this connection, it is assumed that the rows included in a table are given row numbers in order of the first, second . . . from the top to the bottom, and the columns included in the table are given column numbers in order of the first, second . . . from the left to the right. In addition, assume that $H_{max}=1$. First, intermediate data generated by search in the group G1 will be described.

FIGS. 17A and 17B illustrate first examples of intermediate data.

FIG. 17A illustrates intermediate data A1. The intermediate data A1 is generated by extracting a term following the first delimiter with respect to the first column of the source data 141. The "first" delimiter here indicates a delimiter that is found "first" by scanning the string set in a column in order starting with the most left character.

In the first-row record, the string "apple(China)" set in the first column does not include any delimiter. Therefore, the search unit 173 does not extract any term from this record.

In the second-row record, the string "orange Brazil" set in the first column includes a delimiter " " (space). Therefore, the search unit 173 extracts the term "Brazil" following the first delimiter.

The search unit 173 adds a new column to a copy of the source data 141 and sets the extracted terms therein. For example, the search unit 173 does not extract any term from "apple(China)," and therefore does not set anything in the new column with respect to the first-row record. In addition, since the search unit 173 extracts the term "Brazil" from "orange Brazil," it sets "Brazil" in the new column with respect to the second-row record. By doing so, the search unit 173 generates the intermediate data A1 from the source data 141. The search unit 173 stores the intermediate data A1 in the data storage unit 140.

FIG. 17B illustrates intermediate data A2. The intermediate data A2 is generated by extracting a first term that starts with a non-alphabetic character with respect to the first column of the source data 141.

In the first-row record, the string "apple(China)" set in the first column includes a first term "(China)" that starts with a non-alphabetic character. Therefore, the search unit 173 extracts "(China)."

In the second-row record, the string "orange Brazil" set in the first column includes the first term "Brazil" that starts with a non-alphabetic character. Therefore, the search unit 173 extracts "Brazil."

The search unit 173 adds a new column to a copy of the source data 141 and sets the extracted terms therein. For example, with respect to the first-row record, the search unit 173 sets the term "(China)" in the new column. In addition, with respect to the second-row record, the search unit 173 sets the term "Brazil" in the new column. By doing so, the search unit 173 generates the intermediate data A2 from the source data 141. The search unit 173 stores the intermediate data A2 in the data storage unit 140.

Here, the search unit 173 calculates a local evaluation value of each intermediate data using the local evaluation function $f_1$ corresponding to the group G1. The following exemplifies how to calculate local evaluation values of the intermediate data A1 and A2, which are obtained immediately after the source data 141, for easy understanding. In this case, the string extraction is performed only once, so an edit distance from the source data 141 to each of the intermediate data A1 and A2 may be ignored (however, the edit distance from the source data 141 to each of the intermediate data A1 and A2 may be considered).

First, the search unit 173 selects one cell of intermediate data. One cell means one data item (in the case of the intermediate data A1, "apple(China)," "100," or "50") in a record.

The search unit 173 calculates L1=edit distance/max (string length of intermediate data, string length of target data) with respect to the selected cell and each cell in the same row of the target data. Here, the "max" operation is to select the maximum value among the values in parentheses. The search unit 173 takes the minimum L1 value as the distance evaluation value of the selected cell.

The search unit 173 calculates a distance evaluation value for each cell, and calculates an average distance evaluation value among all cells of the intermediate data in question. That is, the search unit 173 divides the total distance evaluation value of all the cells by the number of cells.

The following describes an example of how to calculate a local evaluation value f11 of the intermediate data A1.

Figure 18:
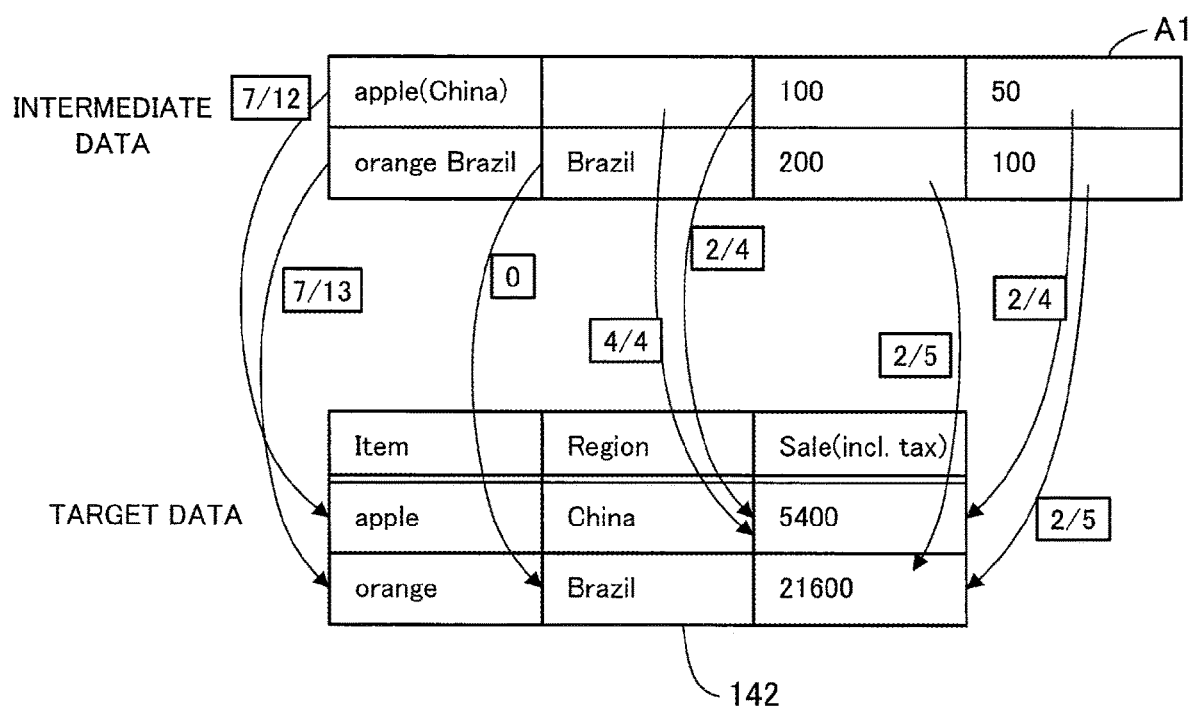
FIG. 18 illustrates a first example of calculating a local evaluation value.

FIG. 18 illustrates a first example of calculating a local evaluation value.

The search unit 173 selects the first cell (a cell having a string "apple(China)") in the first row from the intermediate data A1. The search unit 173 obtains a character count "7" of a differential string portion "(China)" between the string "apple(China)" and the string "apple" in the same row of the target data 142 as an edit distance therebetween. In addition, the search unit 173 calculates max(string length of intermediate data, string length of target data)=max(12, 5)=12. Therefore, with respect to the first cell in the intermediate data A1, L1 is calculated to be L1=7/12.

Similarly, with respect to the first cell in the first row of the intermediate data A1 and the second cell (a cell having "China") of the target data 142, L1 is calculated to be L1=7/12. With respect to the first cell of the intermediate data A1 and the third cell (a cell having "5400") of the target data 142, L1 is calculated to be L1=12/12. Therefore, with respect to the first cell of the intermediate data A1, the distance evaluation value is calculated to be 7/12, which is the minimum value among {7/12, 7/12, 12/12}.

The search unit 173 calculates distance evaluation values for the second and subsequent cells in the first row of the intermediate data A1, in the same manner as the first cell. The distance evaluation value of the second cell (a cell without any data) is 4/4. The distance evaluation value of the third cell (a cell having a value "100" in the first row) is 2/4. The distance evaluation value of the fourth cell (a cell having a value "50") is 2/4.

After that, the search unit 173 calculates a distance evaluation value for each cell in the second row of the intermediate data A1. The distance evaluation value of the first cell (a cell having a string "orange Brazil") in the second row is 7/13. The distance evaluation value of the second cell (a cell having a string "Brazil") in the second row is 0. The distance evaluation value of the third cell (a cell having a value "200") in the second row is 2/5. The distance evaluation value of the fourth cell (a cell having a value "100" in the second row) in the second row is 2/5.

In this case, the total distance evaluation value of all the cells in the intermediate data A1 is calculated to be 7/12+7/13+4/4+0+2/4+2/5+2/4+2/5=about 3.92. Therefore, the local evaluation value f11 of the intermediate data A1 is calculated to be about 3.92/8=about 0.49.

The following describes an example of how to calculate a local evaluation value f12 of the intermediate data A2.

Figure 19:
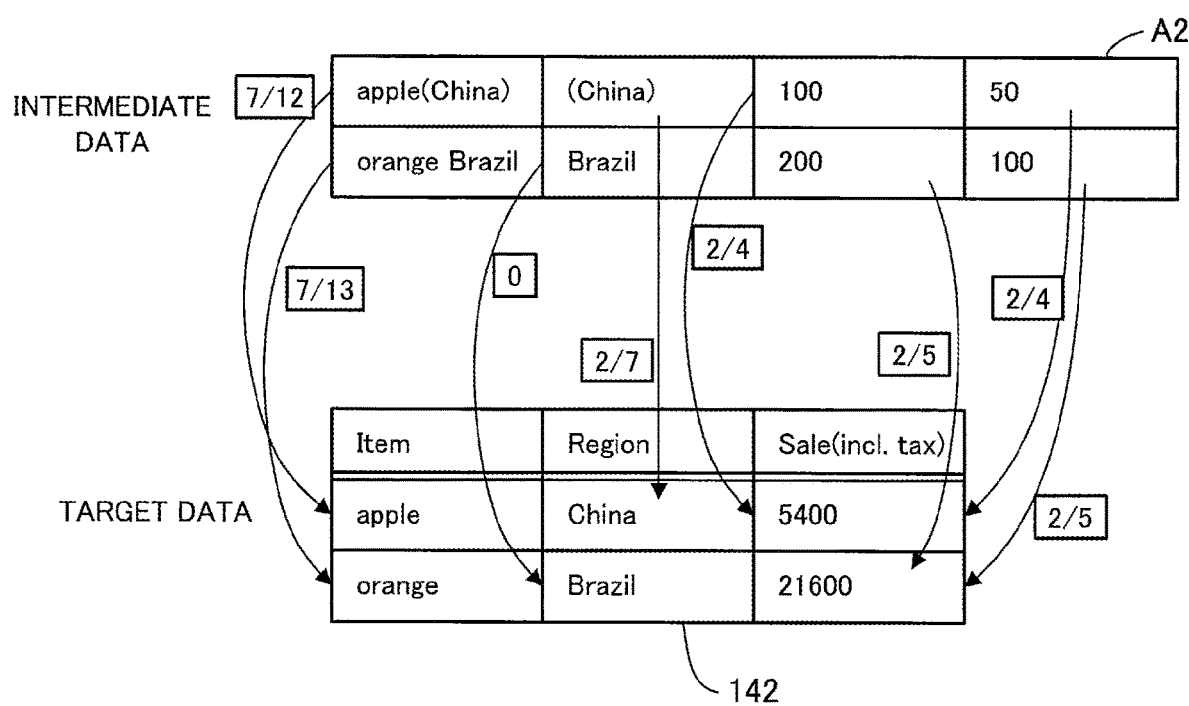
FIG. 19 illustrates a second example of calculating a local evaluation value.

FIG. 19 illustrates a second example of calculating a local evaluation value.

The search unit 173 calculates a distance evaluation value for each cell with respect to the intermediate data A2, in the same manner as explained with reference to FIG. 18. With respect to the first row of the intermediate data A2, the distance evaluation value of each cell is as follows. The distance evaluation value of the first cell is 7/12. The distance evaluation value of the second cell is 2/7. The distance evaluation value of the third cell is 2/4. The distance evaluation value of the fourth cell is 2/4.

With respect to the second row of the intermediate data A2, the distance evaluation value of each cell is as follows. The distance evaluation value of the first cell is 7/13. The distance evaluation value of the second cell is 0. The distance evaluation value of the third cell is 2/5. The distance evaluation value of the fourth cell is 2/5.

In this case, the total distance evaluation value of all the cells in the intermediate data A2 is calculated to be 7/12+7/13+2/7+0+2/4+2/5+2/4+2/5=about 3.21. Therefore, the local evaluation value f12 of the intermediate data A2 is calculated to be about 3.21/8=about 0.40.

The following describes intermediate data generated by search in the group G2.

Figure 20A:
FIGS. 20A and 20B illustrate second examples of intermediate data.
Figure 20B:

FIGS. 20A and 20B illustrate second examples of intermediate data.

FIG. 20A illustrates intermediate data B1. The intermediate data B1 is generated by calculating the product of the second and third columns of the source data 141.

With respect to the first row, the search unit 173 calculates the product of a value "100" and a value "50" to get "5000." With respect to the second row, the search unit 173 calculates the product of a value "200" and a value "100" to get "20000."

The search unit 173 sets the calculated values "5000" (first row) and "20000" (second row) in a new column. By doing so, the search unit 173 generates the intermediate data B1 from the source data 141. The search unit 173 stores the intermediate data B1 in the data storage unit 140.

FIG. 20B illustrates intermediate data B2. The intermediate data B2 is generated by calculating the sum of the second and third columns of the source data 141.

With respect to the first row, the search unit 173 calculates the sum of a value "100" and a value "50" to get "150." With respect to the second row, the search unit 173 calculates the sum of a value "200" and a value "100" to get "300."

The search unit 173 sets the calculated values "150" (first row) and "300" (second row) in a new column. By doing so, the search unit 173 generates the intermediate data B2 from the source data 141. The search unit 173 stores the intermediate data B2 in the data storage unit 140.

Now, the search unit 173 calculates a local evaluation value of each intermediate data using the local evaluation function $f_2$ corresponding to the group G2. The following exemplifies how to calculate local evaluation values of the intermediate data B1 and B2, which is obtained immediately after the source data 141, for easy understanding. In this case, the value conversion is performed only once, and so a value difference between the source data 141 and each of the intermediate data B1 and B2 may be ignored (however, the value difference between the source data 141 and each of the intermediate data B1 and B2 may be considered).

In the value conversion, a value difference is calculated only for value cells (cells having values). First, the search unit 173 selects one of the value cells from intermediate data.

The search unit 173 calculates L2=abs(value difference)/max(abs(value of intermediate data), abs(value of target data)) with respect to the selected value cell and each value cell in the same row of the target data. Here, the "abs" operation is to take an absolute value of a value in parentheses. The search unit 173 takes the minimum L2 value as the distance evaluation value of the selected value cell.

The search unit 173 calculates a distance evaluation value for each value cell, and calculates an average distance evaluation value among all value cells of the intermediate data in question. That is, the search unit 173 divides the total distance evaluation value of all the value cells by the number of value cells.

The following describes an example of how to calculate a local evaluation value f21 of the intermediate data B1.

Figure 21:
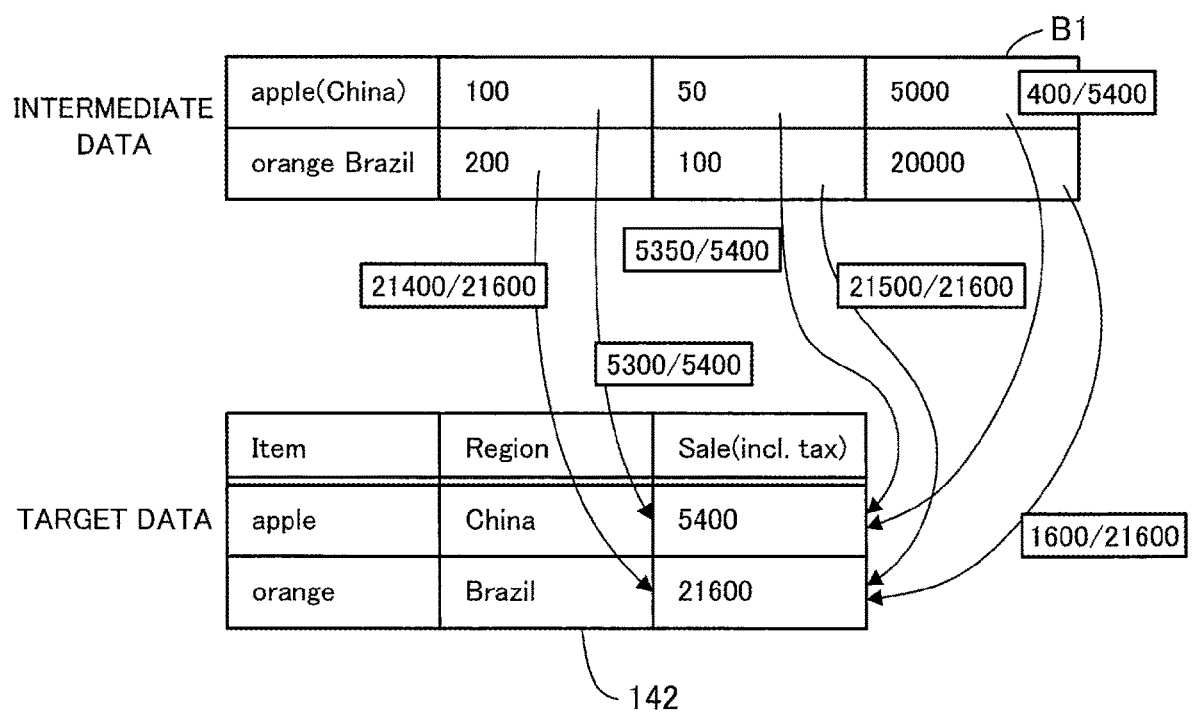
FIG. 21 illustrates a third example of calculating a local evaluation value.

FIG. 21 illustrates a third example of calculating a local evaluation value.

The search unit 173 selects the first value cell (a cell having a value "100" in the first row) in the first row from the intermediate data B1. The search unit 173 obtains a value difference 5400−100=5300 between the value "100" and the value "5400" set in the value cell in the same row of the target data 142. In addition, max(abs(value of intermediate data), abs(value of target data))=max(100, 5400)=5400. Therefore, with respect to the first value cell in the intermediate data B1, L2 is calculated to be L2=5300/5400. Since the target data 142 includes one value cell in the first row, the L2 value is taken as a distance evaluation value. Therefore, the search unit 173 takes "5300/5400" as the distance evaluation value of the first value cell in the first row of the intermediate data B1.

The search unit 173 calculates distance evaluation values for the second and subsequent value cells in the first row of the intermediate data B1, in the same manner as the first value cell. The distance evaluation value of the second value cell (a cell having a value "50") is 5350/5400. The distance evaluation value of the third value cell (a cell having a value "5000") is 400/5400.

After that, the search unit 173 calculates a distance evaluation value for each value cell in the second row of the intermediate data B1. The distance evaluation value of the first value cell (a cell having a value "200") in the second row is 21400/21600. The distance evaluation value of the second value cell (a cell having a value "100" in the second row) in the second row is 21500/21600. The distance evaluation value of the third value cell (a cell having a value "20000") in the second row is 1600/21600.

In this case, the total distance evaluation value of all the value cells of the intermediate data B1 is calculated to be 5300/5400+21400/21600+5350/5400+21500/21600+400/5400+1600/21600=about 4.11. Therefore, the local evaluation value f21 of the intermediate data B1 is calculated to be about 4.11/6=about 0.685.

The following describes an example of how to calculate a local evaluation value f22 of the intermediate data B2.

Figure 22:
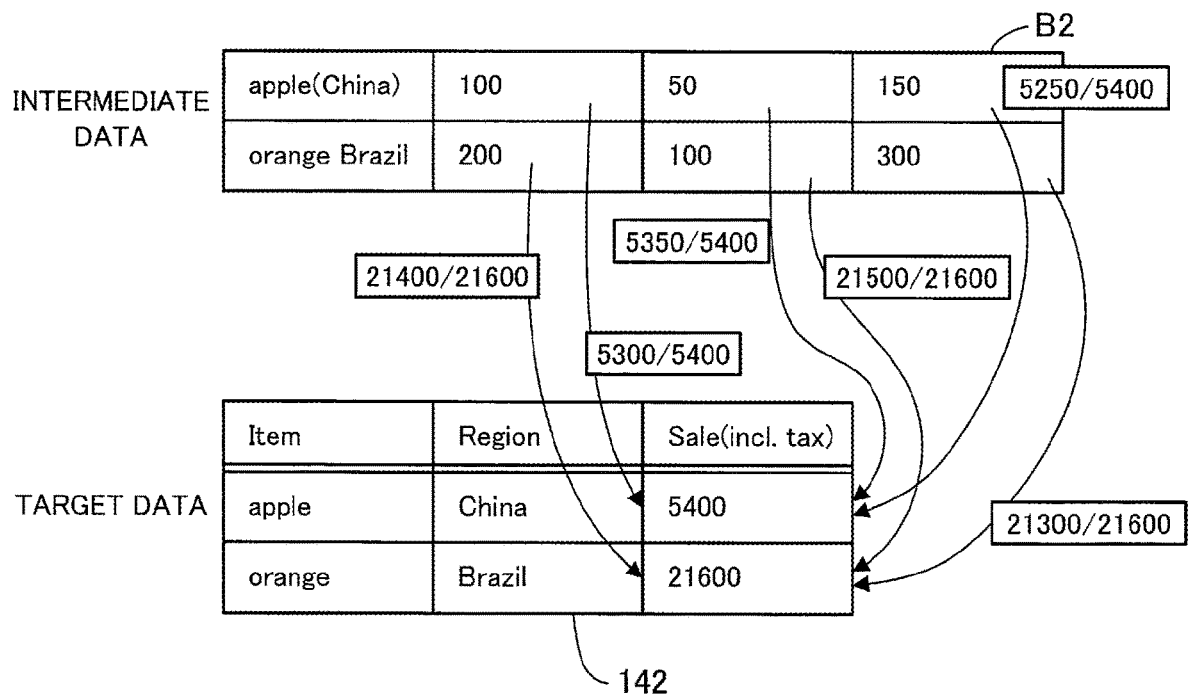
FIG. 22 illustrates a fourth example of calculating a local evaluation value.

FIG. 22 illustrates a fourth example of calculating a local evaluation value.

The search unit 173 calculates a distance evaluation value for each value cell with respect to the intermediate data B2 in the same manner as explained with reference to FIG. 21. With respect to the first row of the intermediate data B2, the distance evaluation value of each value cell is as follows. The distance evaluation value of the first value cell is 5300/5400. The distance evaluation value of the second value cell is 5350/5400. The distance evaluation value of the third value cell is 5250/5400.

With respect to the second row of the intermediate data B2, the distance evaluation value of each value cell is as follows. The distance evaluation value of the first value cell is 21400/21600. The distance evaluation value of the second value cell is 21500/21600. The distance evaluation value of the third value cell is 21300/21600.

In this case, the total distance evaluation value of all the value cells of the intermediate data B2 is calculated to be 5300/5400+21400/21600+5350/5400+21500/21600+5250/5400+21300/21600=about 5.92. Therefore, the local evaluation value f22 of the intermediate data B2 is calculated to be about 5.92/6=about 0.986.

As described earlier, $H_{max}$=1. In this case, when the one-hop search is completed, a final node is determined for each of the groups G1 and G2, and a start node for the next-stage search is selected from the final nodes on the basis of the global evaluation values of the final nodes.

Figure 23:
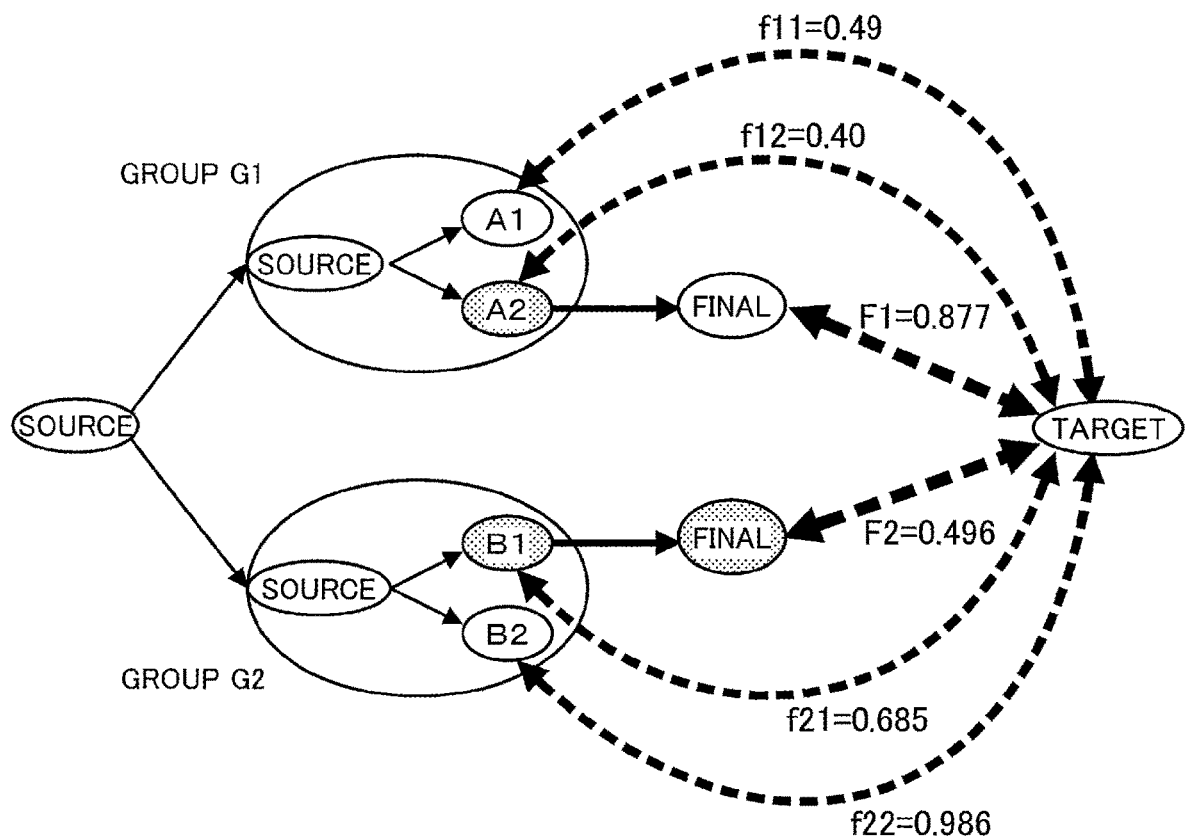
FIG. 23 illustrates an example of calculating a global evaluation value.

FIG. 23 illustrates an example of calculating a global evaluation value.

In the group G1, the local evaluation value f11 of the intermediate data A1 is 0.49. In addition, the local evaluation value f12 of the intermediate data A2 is 0.40. Since local evaluation value f12<local evaluation value f11, the search unit 173 takes the intermediate node corresponding to the intermediate data A2 as the final node of the group G1.

In the group G2, the local evaluation value f21 of the intermediate data B1 is 0.685. In addition, the local evaluation value f22 of the intermediate data B2 is 0.986. Since local evaluation value f21<local evaluation value f22, the search unit 173 takes the intermediate node corresponding to the intermediate data B1 as the final node of the group G2.

The search unit 173 evaluates the final node (corresponding to the intermediate data A2) of the group G1 using a global evaluation function F. As described earlier, the global evaluation function F is a linear combination of all local evaluation functions and is expressed as the equation (1). In the example of the groups G1 and G2, a linear combination of the local evaluation functions $f_1$ and $f_2$ is used. As an example, assume now that a weight for the local evaluation function $f_1$ is $\lambda_1$=0.7 and a weight for the local evaluation function $f_2$ is $\lambda_2$=0.3.

In this case, the global evaluation value F1 of the intermediate data A2 is expressed as the following equation (4).

$$\text{Global evaluation value } F1 = 0.7 \times \text{Local evaluation value } f12 + 0.3 \times \text{Local evaluation value } f2 \text{ (between the intermediate data } A2 \text{ and the target data } 142) \quad (4)$$

Here, the local evaluation value f2 (between the intermediate data A2 and the target data 142) is calculated to be (5300/5400+5350/5400+21400/21600+21500/21600)/4=1.99.

Then, the search unit 173 substitutes this value into the equation (4) to thereby calculate the global evaluation value F1 to be 0.7×0.40+0.3×1.99=0.877.

In addition, the global evaluation value F2 of the intermediate data B1 is expressed as the following equation (5).

$$\text{Global evaluation value } F2 = 0.7 \times \text{Local evaluation value } f1 \text{ (between the intermediate data } B1 \text{ and the target data } 142) + 0.3 \times \text{Local evaluation value } f21 \quad (5)$$

The local evaluation value f1 (between the intermediate data B1 and the target data 142) here is calculated to be (7/12+3/4+2/4+1/4+7/13+2/5+2/5+2/5)/8=0.415.

Then, the search unit 173 substitutes this value into the equation (5) to calculate the global evaluation value $F_2$ to be 0.7×0.415+0.3×0.685=0.496.

Since global evaluation function F2<global evaluation function F1, the search unit 173 determines to take the intermediate node corresponding to the intermediate data B1 among the intermediate data A2 and B1 as the start node for the next-stage search.

As described above, the search apparatus 100 uses local evaluation functions and a global evaluation function for different purposes in such a way as to use the local evaluation functions in group-by-group search and use the global evaluation function to select the next start node. By doing so, it is possible to achieve efficient group-by-group search and to appropriately select a node to be estimated to have a relatively low cost for the subsequent search, as a start node, on the basis of a plurality of search results obtained by the group-by-group search.

Figure 24:
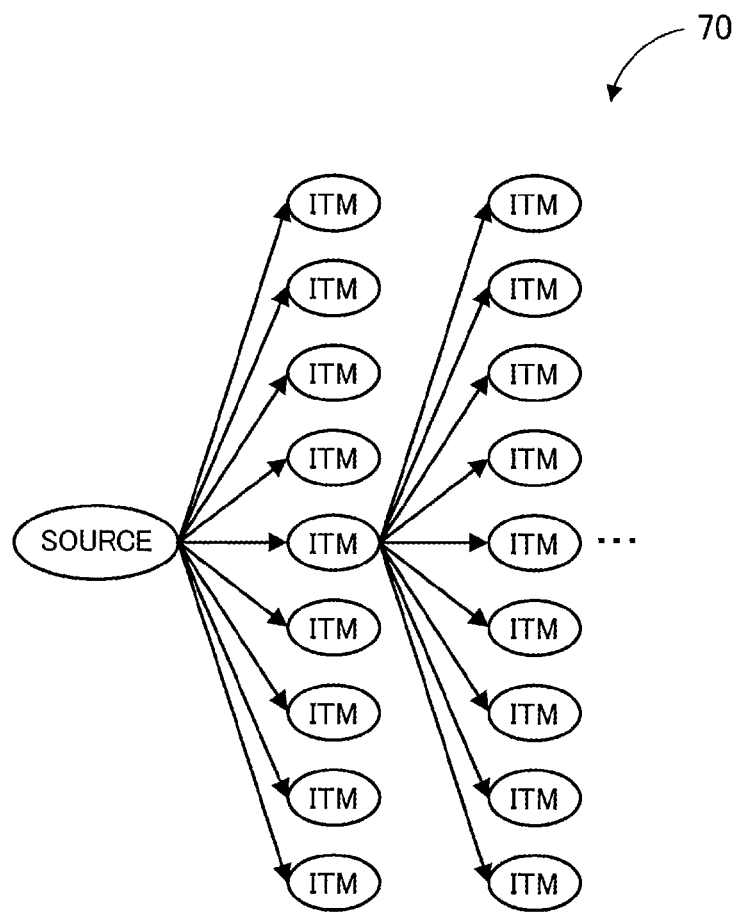
FIG. 24 illustrates a comparative example of a search.

FIG. 24 illustrates a comparative example of a search.

A graph 70 illustrates search paths in the case of carrying out a search according to an A* algorithm, without classifying conversion methods into groups. In this case, as the number of conversion methods T to be used increases, the number of combinations of conversion methods increases and the processing cost for the search increases. More specifically, a search space increases by the exponent (power) of T. If the search space is large, a huge amount of rework may be needed even if the search is carried out according to values of an evaluation function. That is, as the search space increases, more time is needed to carry out the search.

By contrast, the search apparatus 100 is designed to limit the conversion methods to be searched to conversion methods belonging to groups, in order to reduce the search space, compared with the case of searching all conversion methods.

That is, the search apparatus 100 produces intermediate data by continuously using only specific types of conversion methods belonging to a group, and searches for a combination of conversion methods on the basis of the intermediate data. That is, search paths that make attempt to use other different types of conversion methods alternately are pruned. This makes it possible to reduce the search space efficiently and thus to reduce the search time.

In addition, in the case of searching all conversion methods, an evaluation function needs to be defined such as to be applicable to all the data conversion methods. However, as the types of conversion methods increase, it becomes more difficult to appropriately define such an evaluation function. By contrast, by limiting conversion methods to be searched to conversion methods belonging to groups, it becomes possible to reduce the types of conversion methods to which an evaluation function needs to be applied. This leads to simplifying the evaluation function, improving the accuracy of the evaluation function, and enhancing the possibility of selecting an appropriate path, in each group. As a result, it is possible to reduce search paths and the search time.

In this connection, the information processing of the first embodiment is implemented by causing the processing unit 12 to execute programs. In addition, the information processing of the second embodiment is implemented by causing the CPU 101 to execute programs. Such programs may be recorded in the computer-readable recording medium 113.

For example, the recording media 113 on which the programs are recorded are put on sale, thereby making it possible to distribute the programs. In addition, the programs may be stored in another computer and then be distributed over a network. The computer stores (installs) the programs recorded on a recording medium 113 or the programs received from the other computer, in a local storage device, such as the RAM 102 or HDD 103, and then reads the programs from the storage device and runs the programs.

According to one aspect, it is possible to reduce the search time.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing a computer program that causes a computer to perform a process comprising:
    obtaining input data and output data;
    classifying a plurality of data conversion methods into a plurality of groups;
    producing, with respect to each of the plurality of groups, intermediate data from the input data using data conversion methods belonging to the each of the plurality of groups and evaluating the intermediate data using an evaluation function corresponding to the each of the plurality of groups, in order to carry out a search for a combination of data conversion methods within the each of the plurality of groups, the evaluation function providing a cost for a path from the input data via the intermediate data to the output data; and
    determining a combination of data conversion methods that is able to convert the input data into the output data, based on results of the search carried out for the plurality of groups,
    the classifying includes determining a group count based on a function that indicates a rate of reduction in a search space according to an index value and classifying the plurality of data conversion methods into the plurality of groups according to the group count, the index value indicating a distance between the input data and the output data, the search space being for searching for the combination of data conversion methods.

2. A search method executed by a computer, the method comprising:
    obtaining input data and output data;
    classifying, by a processor of the computer, a plurality of data conversion methods into a plurality of groups;
    producing, by the processor, with respect to each of the plurality of groups, intermediate data from the input data using data conversion methods belonging to the each of the plurality of groups and evaluating the intermediate data using an evaluation function corresponding to the each of the plurality of groups, in order to carry out a search for a combination of data conversion methods within the each of the plurality of groups, the evaluation function providing a cost for a path from the input data via the intermediate data to the output data; and
    determining, by the processor, a combination of data conversion methods that is able to convert the input data into the output data, based on results of the search carried out for the plurality of groups,
    the classifying includes determining a group count based on a function that indicates a rate of reduction in a search space according to an index value and classifying the plurality of data conversion methods into the plurality of groups according to the group count, the index value indicating a distance between the input data and the output data, the search space being for searching for the combination of data conversion methods.

3. The non-transitory computer-readable recording medium according to claim 1, wherein:
    the process further includes calculating a coefficient indicating a relationship between a number of data conversion methods used for converting different input data into different output data and another index value indicating a distance between the different input data and the different output data; and
    the classifying includes determining the group count, based on the index value and the coefficient.

4. The non-transitory computer-readable recording medium according to claim 1, wherein the classifying includes generating as many groups as the determined group count, with reference to similarity information indicating similarity between the plurality of data conversion methods.

5. The non-transitory computer-readable recording medium according to claim 1, wherein:
    the plurality of data conversion methods are respectively associated with evaluation functions; and
    the classifying includes classifying the plurality of data conversion methods, based on commonality of the evaluation functions.

6. The non-transitory computer-readable recording medium according to claim 1, wherein the process further includes:
    extracting, upon determining that the output data has not been reached from the input data in the search carried out for the plurality of groups, representative intermediate data among intermediate data generated by carrying out the search in each of the plurality of groups, evaluating the representative intermediate data of the plurality of groups using a common evaluation function different from evaluation functions respectively corresponding to the plurality of groups, and selecting representative intermediate data of one of the plurality of groups; and carrying out the search again in each of the plurality of groups with the selected representative intermediate data as a base point, in place of the input data.

7. The non-transitory computer-readable recording medium according to claim 5, wherein, upon classifying a first data conversion method associated with a first evaluation function and a second data conversion method associated with a second evaluation function into a same group, the classifying includes calculating an evaluation function corresponding to the same group, based on the first evaluation function and the second evaluation function.

8. The non-transitory computer-readable recording medium according to claim 6, wherein the representative intermediate data of each of the plurality of groups is intermediate data that is highest in evaluation based on the evaluation function corresponding to the each of the plurality of groups among the intermediate data generated by the search in the each of the plurality of groups.

* * * * *